(12) United States Patent
Fukushi et al.

(10) Patent No.: US 8,851,559 B2
(45) Date of Patent: Oct. 7, 2014

(54) LID-FASTENING STRUCTURE

(75) Inventors: Yoshinori Fukushi, Wako (JP); Koji Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/978,242

(22) PCT Filed: Nov. 28, 2011

(86) PCT No.: PCT/JP2011/077310
§ 371 (c)(1),
(2), (4) Date: Jul. 3, 2013

(87) PCT Pub. No.: WO2012/093528
PCT Pub. Date: Jul. 12, 2012

(65) Prior Publication Data
US 2013/0285416 A1    Oct. 31, 2013

(30) Foreign Application Priority Data

Jan. 7, 2011    (JP) .................................. 2011-002281
Jan. 7, 2011    (JP) .................................. 2011-002316

(51) Int. Cl.
| | | |
|---|---|---|
| B62D 35/02 | (2006.01) | |
| B62D 25/20 | (2006.01) | |
| B62D 21/11 | (2006.01) | |
| B62D 25/12 | (2006.01) | |
| B62D 25/08 | (2006.01) | |

(52) U.S. Cl.
CPC ............... *B62D 25/20* (2013.01); *B62D 35/02* (2013.01); *B62D 21/11* (2013.01); *B62D 25/2018* (2013.01); *B62D 25/12* (2013.01); *B62D 25/082* (2013.01)
USPC .......................... 296/204; 296/180.1; 296/199

(58) Field of Classification Search
CPC .................................. B62D 25/20; B62D 5/02
USPC .................. 296/38, 204, 180.1, 191, 193.01, 296/193.07, 199; 180/69.1; 411/372, 999
See application file for complete search history.

(56) References Cited

U.S. PATENT DOCUMENTS

| | | | | |
|---|---|---|---|---|
| 3,927,489 A | * | 12/1975 | Bernstein | ...................... 446/104 |
| 4,844,565 A | * | 7/1989 | Brafford et al. | ............ 312/107.5 |
| 2007/0248436 A1 | * | 10/2007 | Sano | ............................. 411/175 |

FOREIGN PATENT DOCUMENTS

| | | |
|---|---|---|
| JP | S59-76483 | 5/1984 |
| JP | S61-193219 | 12/1986 |
| JP | H03-119659 | 12/1991 |
| JP | H05-19069 | 3/1993 |
| JP | H06-62212 | 9/1994 |
| JP | 07-280317 | 10/1995 |
| JP | 09-037853 | 2/1997 |

(Continued)

*Primary Examiner* — Dennis H Pedder
*Assistant Examiner* — Beverly Becker
(74) *Attorney, Agent, or Firm* — Rankin, Hill & Clark LLP

(57) ABSTRACT

A lid-fastening structure for fastening a lid using a bolt, which is rotatably held in the lid for closing an adjustment opening. An insertion hole for inserting the bolt is formed in the lid. A portion of the circumferential edge of the insertion hole is cut out in a way that allows the bolt to slide, and a backslide-limiting opening for limiting the return of the bolt to the insertion hole is formed so as to be continuous with the circumferential edge. A supporting/fastening hole is formed continuous with the backslide-limiting opening to a smaller radius than is the insertion hole, the supporting/fastening hole being cut out so as to allow the bolt to advance.

18 Claims, 21 Drawing Sheets

(56) References Cited

FOREIGN PATENT DOCUMENTS

| | | |
|---|---|---|
| JP | 09-041899 | 2/1997 |
| JP | 09-195437 | 7/1997 |
| JP | 2000-177652 | 6/2000 |
| JP | 2003-246247 | 9/2003 |
| JP | 2006-188082 | 7/2006 |

* cited by examiner

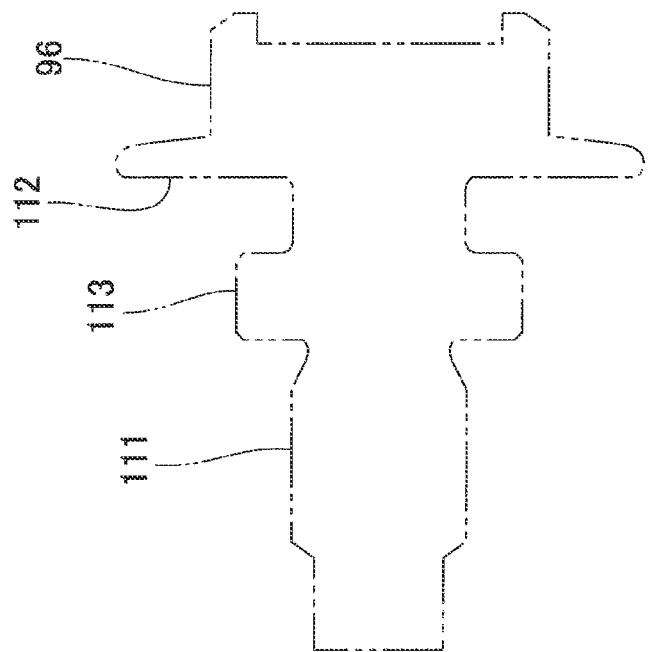
FIG.22
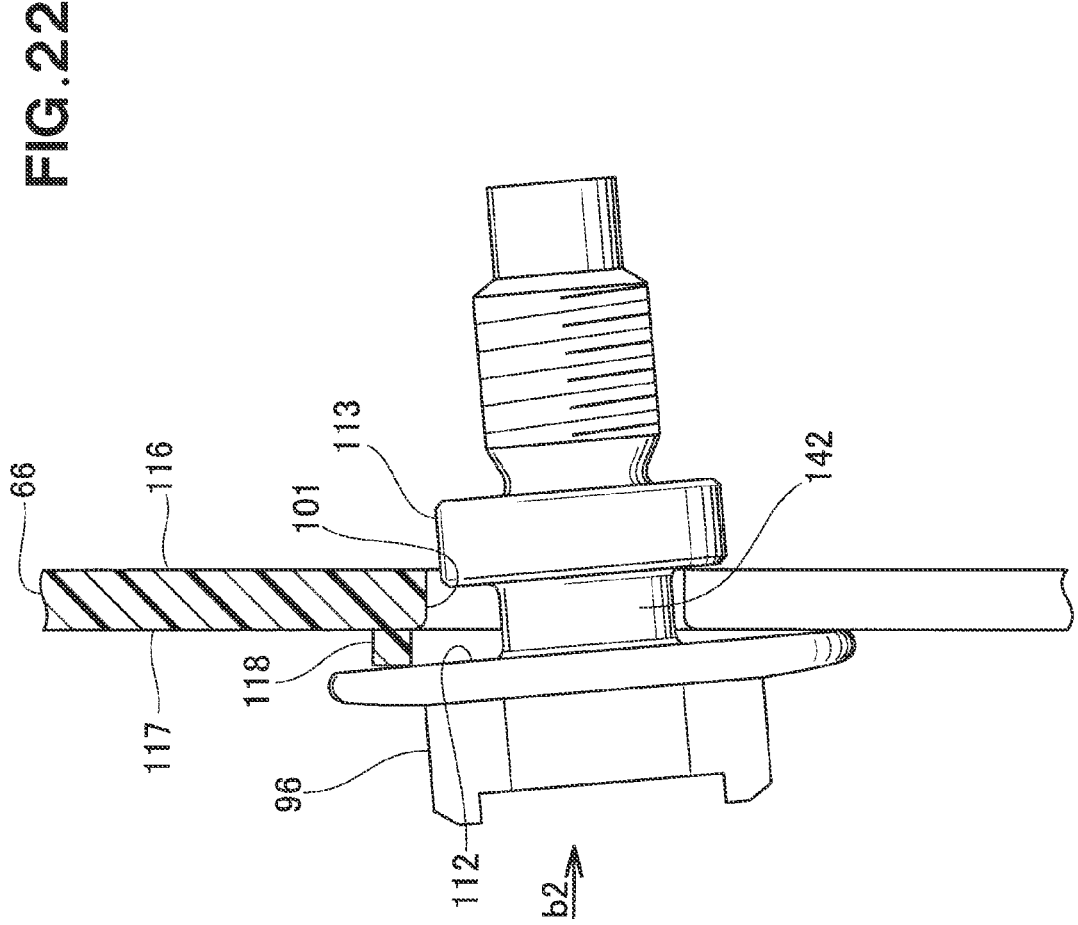

US 8,851,559 B2

LID-FASTENING STRUCTURE

TECHNICAL FIELD

The present invention relates to a structure including a lid for opening and closing an opening and a bolt for fastening the lid to an undercover, and more particularly to a lid-fastening structure for fastening a lid by using a bolt adapted to be threaded into an undercover through a hole formed in the lid.

BACKGROUND ART

A pendant fitment having an oblong hole and a temporary stop plate it) provided on one end side of the oblong hole for fitting engagement with a root of a thread of a bolt is known as disclosed in Patent Document 1, for example. A bolt is inserted into an opposite end side of the oblong hole and, thereafter, the pendant fitment provided with the temporary stop plate is displaced such that the temporary stop plate is caught by the thread of the bolt. The pendant fitment does not need to be supported by a human operator and, hence, a work for threading a nut with the belt becomes ease.

A ceiling hanger having an elongated hole formed by three holes communicating together is disclosed in Patent Document 2. The three holes are a loose fit hole having a diameter larger than an outside diameter of a bolt, a temporary stop hole continuous with the loose fit hole and having a diameter slightly larger than a root diameter of the bolt, and a locking hole continuous with the temporary stop hole and having a diameter for ordinary threading engagement with the bolt. The three holes have a continuous width that allows movement of the bolt from the loose fit hole to the locking hole. The loose fit hole of the ceiling hanger is loosely fitted with the bolt and then the ceiling hanger is displaced such that the temporary stop hole is caught by a thread of the bolt.

A band-like spring member having a C-shaped coupling section and three locking sections extending radially outwards from opposite ends and an intermediate portion of the C-shaped coupling section for gripping a bolt is disclosed in Patent Document 3, for example. The band-like spring member is forced against a bolt so that the bolt moves toward an opening of the C-shaped coupling section, then forcibly opens the coupling section and finally fits with the band-line spring member.

However, when the technique disclosed in Patent Document 1 is applied to a member having an oblong hole, such as a lid or a like swingable member, it may occur that a bolt drops off under its own weight when the lid is opened. Furthermore, it is not possible to turn the bolt so that the bolt is screwed into the lid.

When used with a swingable member such as a lid, the technique disclosed in Patent Document 2 allows a bolt to return from the locking hole to the loose fit hole and eventually come off from the lid. An attempt to prevent returning of the bolt to the loose fit hole by reducing the diameter of the temporary stop hole will cause undue deformation by the bolt and eventually lose its prescribed temporary-stop function.

The technique disclosed in Patent Document 3 involves an increase in the number of parts used because of a stopper function required to prevent returning of the bolt from the opening of the C-shaped coupling section under the resiliency of the spring member. In case where a bolt is to be held on a plate-like member, a separate coupling member must be joined to the plate-like member.

According to the techniques disclosed in Patent Documents 1 to 3, works for fastening a lid (plate-like member) using a bolt cannot be performed speedily.

Patent Document 4 discloses a lid structure including a maintenance lid provided on an undercover located below an engine room. The lid structure is simple in construction, lightweight and inexpensive because the lid is detachable when moved to slid in a forward direction of the vehicle.

However, the lid structure disclosed in Patent Document 4 renders maintenance work and lid-assembling work tedious and time-consuming because when the lid is detached for maintenance, the detached lid should then be placed on a different position via a manual placement operation. Furthermore, when an engine is installed, on a manufacturing line, a tightening work should be performed from below after the undercover is attached, making the lid-assembling operation highly time-consuming. Additionally, the lid requires a pull-out space in front of the undercover, which will enlarge a working space in front of the undercover.

PRIOR ART LITERATURE

Patent Documents

[Patent Document 1] Japanese Patent Application Laid-Open Publication No. H07-280317
[Patent Document 2] Japanese Patent Application Laid-Open Publication No. 1109-195437
[Patent Document 3] Japanese Patent Application Laid-Open Publication No. H09-41899
[Patent Document 4] Japanese Patent Application Laid-Open Publication No. 2000-177652

SUMMARY OF INVENTION

Technical Problem

An object of the present invention is to provide a lid-fastening structure, which is able to ensure that a work for fastening a lid using a bolt can be performed speedily, and which can eliminate the need to provide a separate function to limit returning of the bolt.

Solution to Problem

In the invention according to a first aspect, there is provided a lid-fastening structure comprising: an undercover; a lid for closing an opening formed in the undercover; and a bolt rotatably held in the lid, wherein the lid includes: an insertion hole formed to allow insertion of the bolt; a backslide-limiting opening formed by cutting out a portion of a circumferential edge of the insertion hole in such a way as to allow the bolt to slide, the backslide-limiting opening being continuous with the circumferential edge of the insertion hole and configured to limit returning of the bolt to the insertion hole; a supporting/fastening hole formed continuous with the backslide-limiting opening to a radius smaller than a radius of the insertion hole, the supporting/fastening hole having a circumferential edge partially cut out to allow the bolt to enter the supporting/fastening hole; and a retainer part formed between an external thread and a bearing surface of the bolt for preventing the bolt from dropping off.

In the invention according to a second aspect, preferably, a portion including the backslide-limiting opening of the lid is formed by a material which is elastically deformable when the bolt is caused to slide.

In the invention according to a third aspect, preferably, the backslide-limiting opening has a tapered guide portion having a width reducing gradually in a in a direction away from the insertion hole.

In the invention according to a fourth aspect, preferably, the retainer part is in the form of a disk having a radius smaller than the radius of the insertion hole and larger than the radius of the supporting/fastening hole.

In the invention according to a fifth aspect, preferably, the lid has a front side adapted to be pressed by the bearing surface of the bolt and includes a protrusion formed on a back side thereof, the protrusion being located at such a position as to engage the bearing surface of the bolt when the bolt is inserted in the insertion hole from the back side of the lid.

In the invention according to a sixth aspect, preferably, the lid has one end portion releasably connectable to the undercover and an opposite end portion including a T-shaped engagement hook engaged with and held on the undercover, and the undercover has a stepped section configured to extend along an edge of the lid for engagement with the engagement hook, the stepped section having an assembly hole configured to allow passage of the hook.

In the invention according to a seventh aspect, preferably, the lid has a rib extending from the engagement hook toward the one end portion of the lid.

In the invention according to an eighth aspect, preferably, the stepped section includes a step higher than an inner surface of the undercover, and a bulged portion provided on the step so as to avoid interference with the lid when the lid is closed and lying alongside the inner surface of the undercover.

In the invention according to a ninth aspect, preferably, the lid includes a stepped rib extending across the rib.

In the invention according to a tenth aspect, preferably, the one end portion of the lid is fastened to the undercover by the bolt rotatably supported on the one end portion of the lid.

Advantageous Effects of Invention

In the invention according to the first aspect, the lid has an insertion hole, a backslide-limiting opening continuous with a circumferential edge of the insertion hole for limiting returning of a bolt to the insertion hole, a supporting/fastening hole having a radius smaller than a radius of the insertion hole and cut out to allow the bolt to enter the supporting/fastening hole, and the bolt has a retainer part provided between an external thread and a bearing surface for preventing the bolt to dropping off from the insertion hole. With this arrangement, the bolt can be held on the lid in a condition where the bolt is fitted in the supporting/fastening hole. This can eliminate the need to locate the bolt when the lid is to be reattached after removal. Fastening operation using the bolt can be achieved speedily.

In the invention according to the second aspect, because a portion including the backslide-limiting opening of the lid is formed by a material which is elastically deformable when the bolt is caused to slide, there is no need to provide a separate means for limiting returning of the bolt to the insertion hole.

In the invention according to the third aspect, since the backslide-limiting opening has a tapered guide portion having a width reducing gradually in a direction away from the insertion hole, the bolt is guided by the guide portion and hence is able to move smoothly when the bolt is caused to slide from the insertion hole toward the supporting/fastening hole.

In the invention according to the fourth aspect, since the retainer part is in the form of a disk having a radius smaller than the radius of the insertion hole and larger than the radius of the supporting/fastening hole, the bolt can smoothly move into fitting engagement with the supporting/fastening hole merely by forcing the bolt to slide.

In the invention according to the fifth aspect, by virtue of a protrusion formed on the back side of the lid and located at such a position as to engage the bearing surface of the bolt, when the bolt is inserted in the insertion hole from the back side of the lid, the bolt is caused to tilt to one side due to interference between the bearing surface and the protrusion, making it impossible to fully insert the bolt into the insertion hole. With the bolt thus tilting, the bearing surface and the retainer part of the bolt are non-parallel to a surrounding surface of the insertion hole and may interfere with the lid. The bolt is no longer possible to move (slide) in a direction toward the supporting/fastening hole. Wrong insertion of the bolt from the opposite side (back side) of the lid can thus be prevented.

In the invention according to the sixth aspect, a lid mechanism includes a lid having one end portion detachably connectable to the undercover and an opposite end portion engaged with and held on the undercover or another undercover. The lid includes a T-shaped engagement hook provided on the one end portion, and the undercover has a stepped section configured to extend along an edge of the lid for engagement with the engagement hook, and an assembly hole formed in the stepped section and configured to allow passage of the hook. With this arrangement, the lid hangs down from the stepped section and an edge of the assembly hole where the engagement hook is caught. At the time of manufacture, because the lid is hooked on the undercover and subsequently fastened (attached) to the undercover, the lid assembling operation can be achieved easily in a relatively short period of time.

Furthermore, since the lid can remain in a handing position during maintenance, the maintenance time can be reduced.

In the invention according to the seventh aspect, the rib extending from the engagement hook toward the one end portion of the lid serves to distribute an impact (load) produced when the lid or the engagement hook is subjected to an air resistance, splashing water, or a flying small pebble. The engagement hook is thus protected against undue distortion or flexing which may cause drop off of the lid.

In the invention according to the eighth aspect, since, the stepped section includes a step higher than an inner surface of the undercover, and a bulged portion provided on the step so as to avoid interference with the lid when the lid is closed and lying alongside the inner surface of the undercover, it is possible to arrange the lid alongside the inner surface of the undercover.

In the invention according to the ninth aspect, the stepped rib formed on the lib across the rib is able to reinforce the lid itself. The stepped rib has a function to distribute an impact (load) produced when the underside of the lid is subjected to an air resistance, splashed water, or a flying small pebble. By virtue of the stepped rib, distortion of the lid is further suppressed and drop off of the lid can be avoided with increased reliability.

In the invention according to the tenth aspect, since the one end portion of the lid is fastened to the undercover by the bolt rotatably supported on the one end portion of the lid, working time for fastening the lid using the bolt can be further reduced. This will allow for temporary opening of the lid during a vehicle-assembly-line operation for the purpose of achieving a work inside the engine room.

BRIEF DESCRIPTION OF DRAWINGS

FIG. 22 is a view showing the manner in which the bolt is assembled with the lid;

DESCRIPTION OF EMBODIMENTS

A preferred embodiment of the present invention will be described below in greater detail with reference to the accompanying sheets of drawings.

Embodiment

Figure 1:
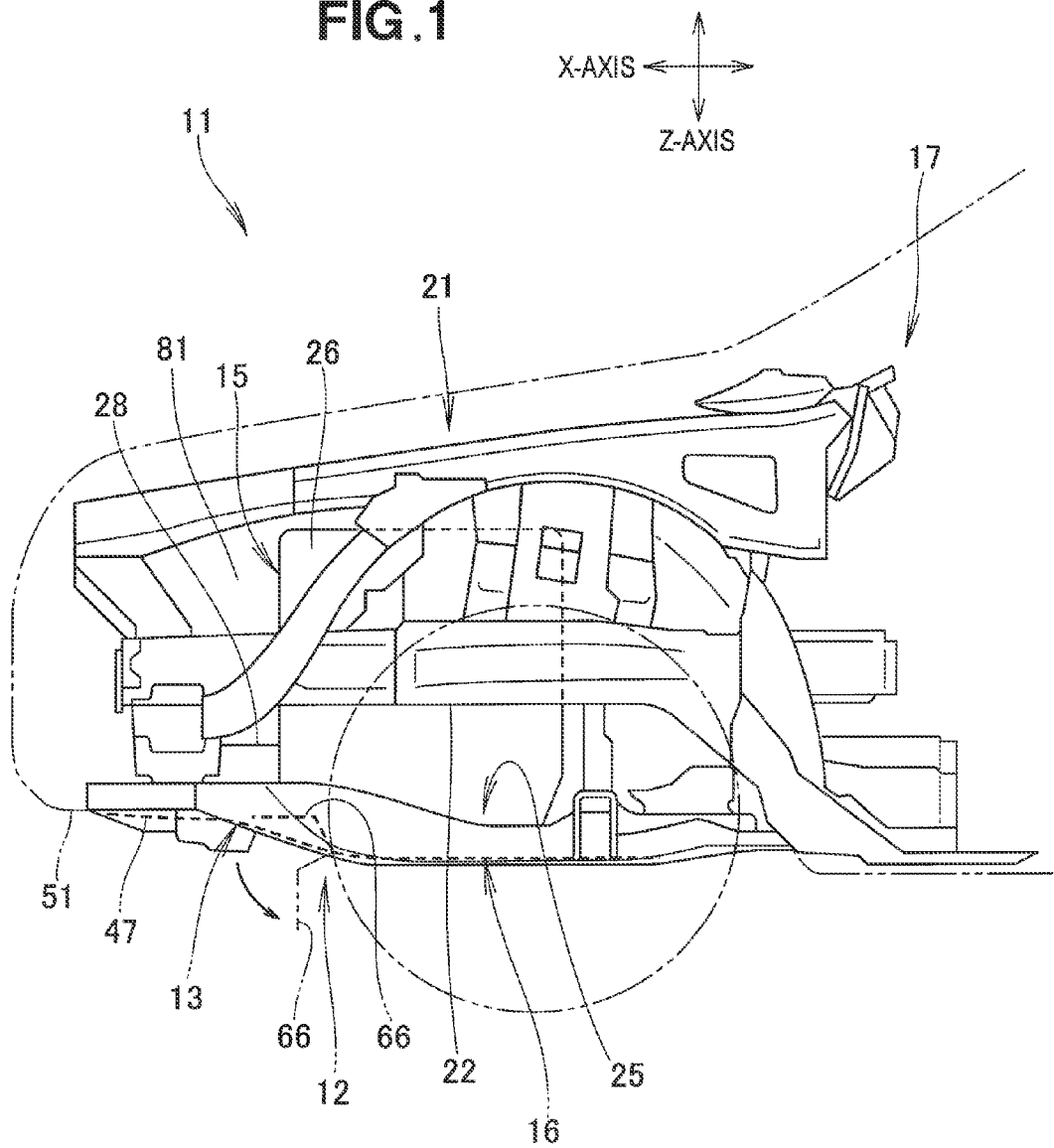
FIG. 1 is a side view of a vehicle body front part in which a lid-fastening structure according to an embodiment of the present invention is incorporated.
Figure 2:
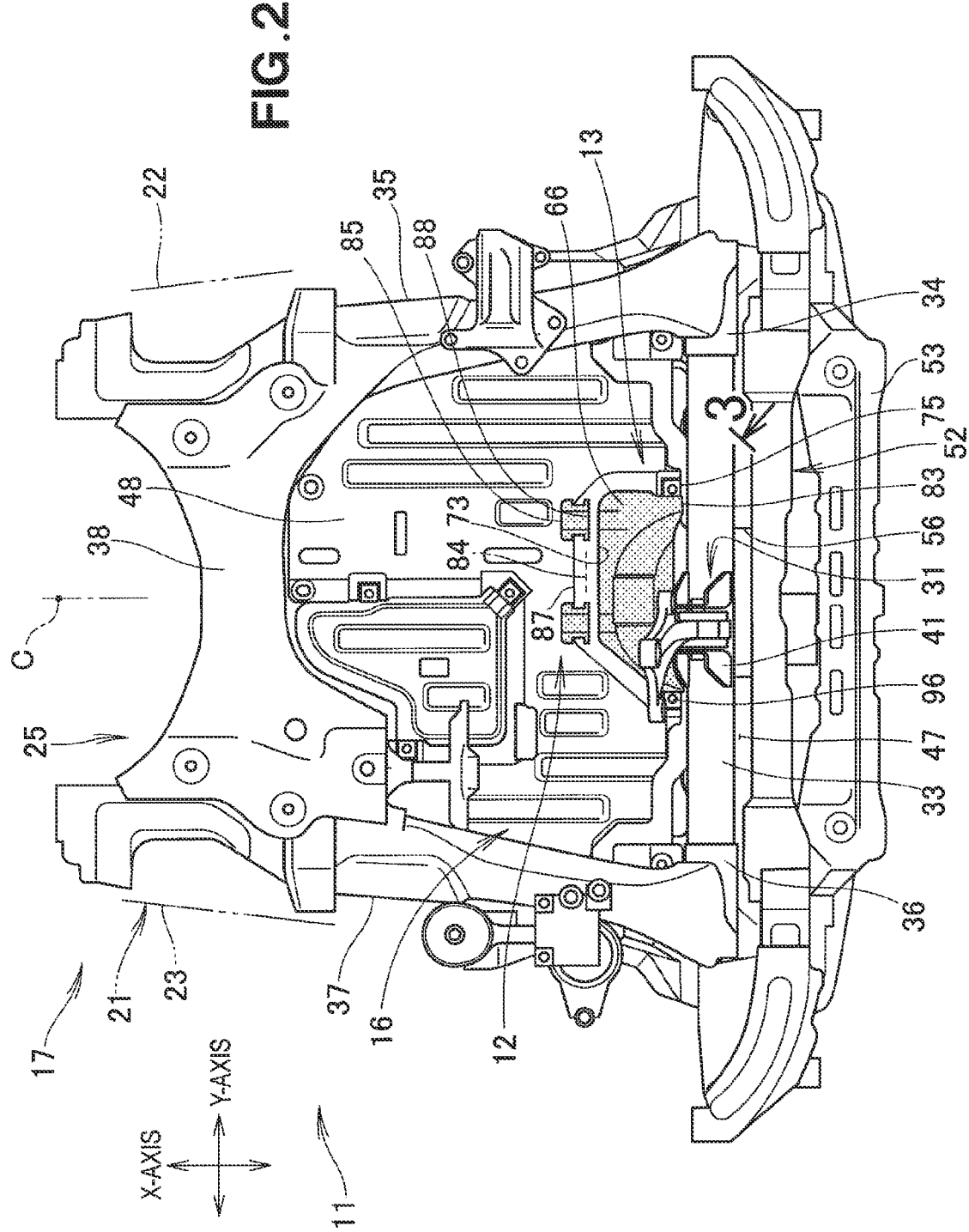
FIG. 2 is a plan view illustrative of the manner in which an undercover is mounted.

As shown in FIGS. 1 and 2, a vehicle 11 is provided with a lid structure 12 and a lid-fastening structure 13. The lid structure 12 and the lid-fastening structure 13 are provided on an undercover 16 which covers an engine 15 from below.

The vehicle 11 includes a vehicle body 17 having a front body 21, and the engine 21 supported on the front body 21. The front body 21 includes a left front side frame 22, a right front side frame 23 (FIG. 2) substantially the same as the left front side frame 22, and a front sub-frame 25 mounted to the left and right front side frames 22, 23 from below.

The right front side frame 23 and the left front side frame 22 are substantially symmetric with respect to a longitudinal centerline C passing through the center in a vehicle width direction.

The engine 15 is of the horizontal type. An engine body 26 has pistons (not shown) arranged in the width direction of the vehicle 11. A non-illustrated transmission integrally connected with the engine body 26 is arranged to extend in the vehicle width direction.

With the engine body 26 and the transmission 26 being integrally united together, the engine body 26 of the engine 15 is fastened to the left and right front side frames 22, 23. The engine 15 has a front bracket 28 supported on an engine front mount 31 of the front sub-frame 25.

The sub-frame 25 is formed into parallel crosses in a plan view of the vehicle 11. The sub-frame 25 includes a front crossbeam 33 disposed adjacent to a front face of the vehicle, a left beam 35 extending from a left end 34 of the front crossbeam 33 in a rearward direction of the vehicle, a right beam 37 extending from a right end 36 of the front crossbeam 33 in a rearward direction of the vehicle, a rear crossbeam 38 interconnecting a rear end of the left barn 35 and a rear end of the right beam 37, and the engine front mount 31 provided on the middle of the front crossbeam 33.

Figure 3:
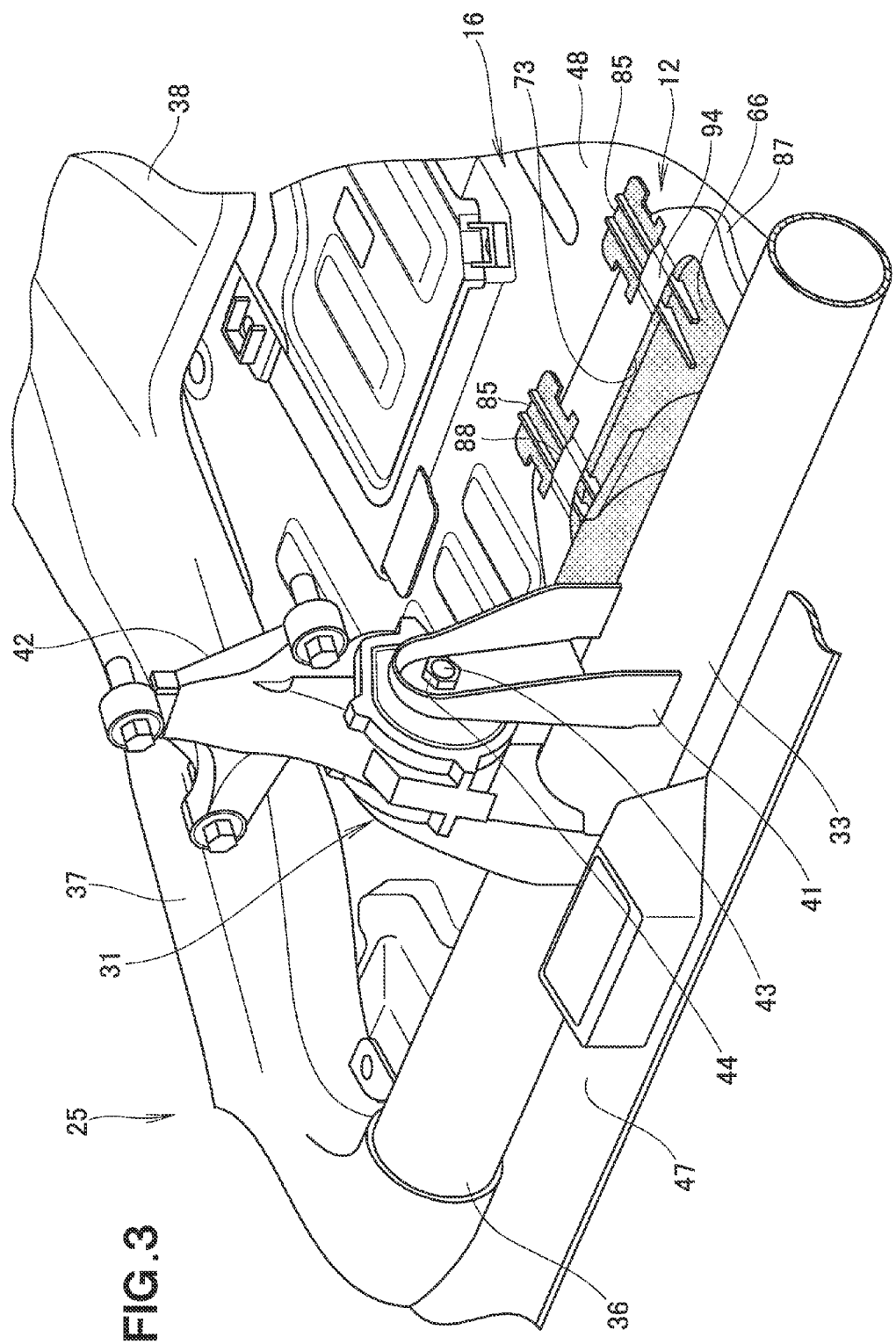
FIG. 3 is a view in the direction of the arrow 3 in FIG. 2.

As shown in FIG. 3, the engine front mount 31 supports a front part of the engine 15 and includes a base 41 joined to the front crossbeam 33, and an engine fastening member 42 secured to the base 41 by means of a bolt 43 and a nut 44. As shown in FIG. 2, the undercover 16 is attached to the sub-frame 25 from below.

Figure 6:
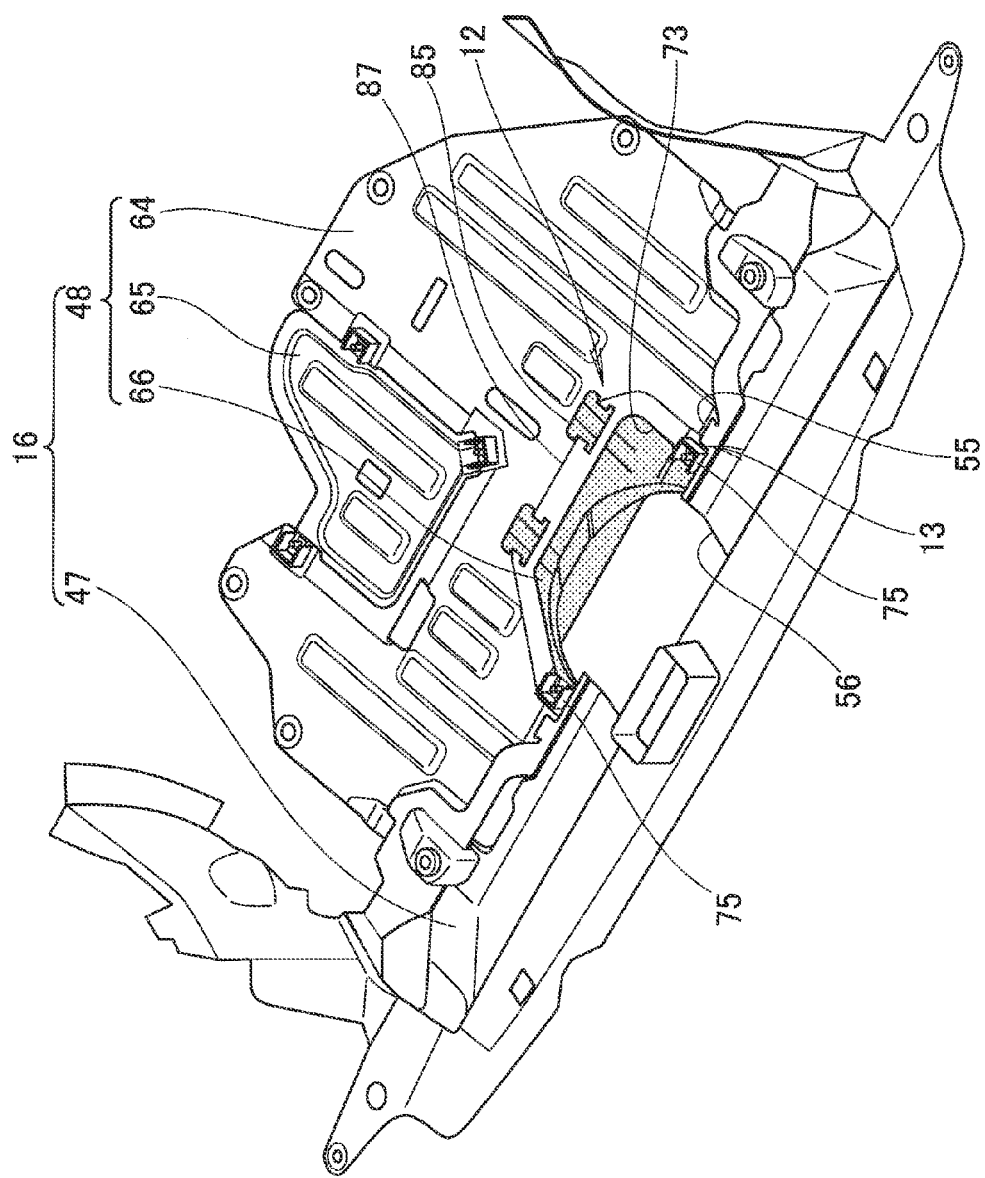
FIG. 6 is a perspective view of the undercover shown in FIG. 5.

The undercover 16 is composed of a front undercover 47 and a rear undercover 48, as shown in FIGS. 2 and 6.

The front undercover 47 is formed from synthetic resin or plastic and extends from a bumper-face lower end 51 (FIG. 1) and a front bulkhead lower member 53 of a front bulkhead 52 to the front crossbeam 33 such that the front undercover 47 reaches the rear undercover 48. The front undercover 47 is fixed to the bumper-face lower end 51 and the front bulkhead lower member 53 by means of clips (not shown).

Figure 4:
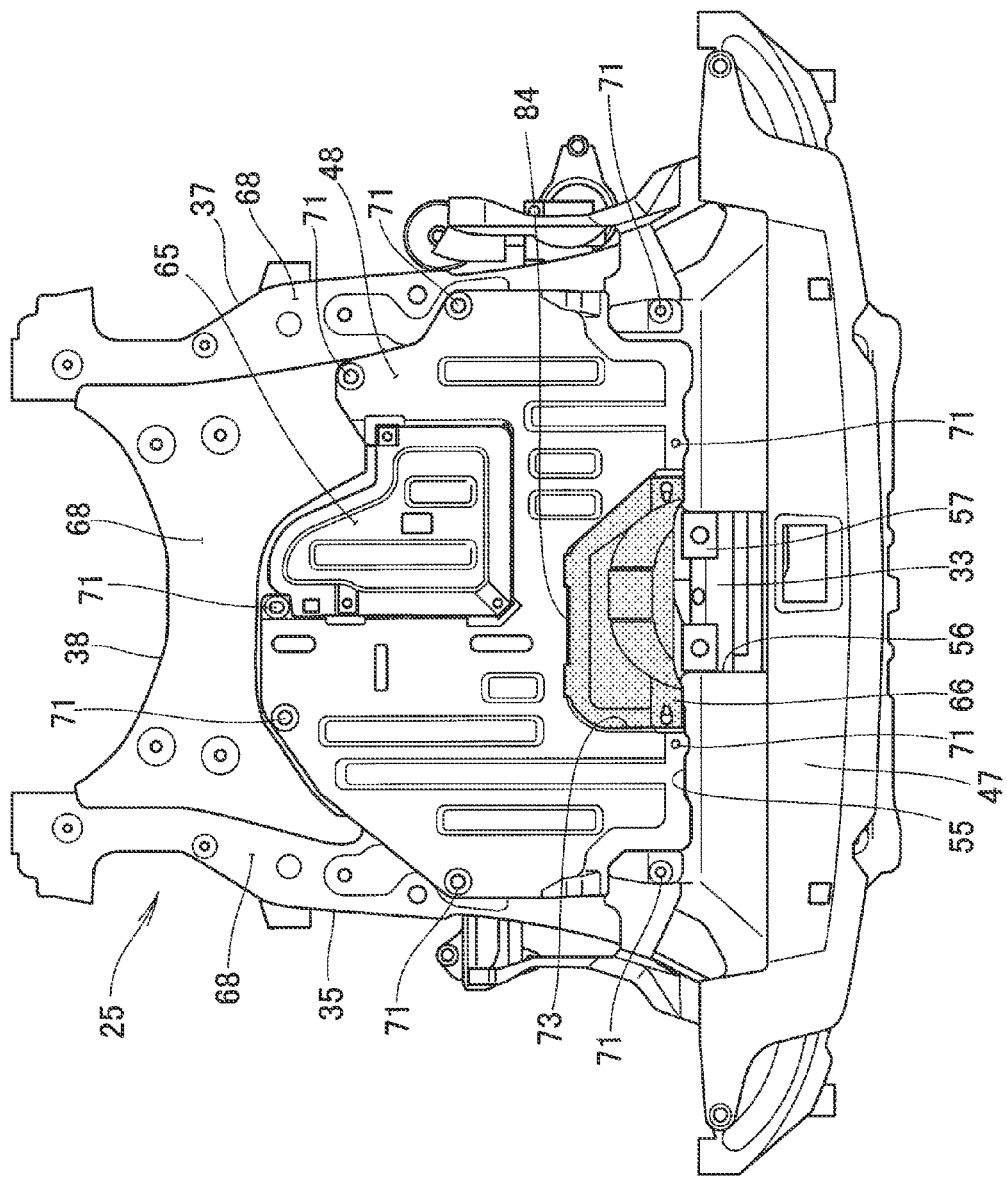
FIG. 4 is a bottom view showing the mounted condition of the undercover.
Figure 5:
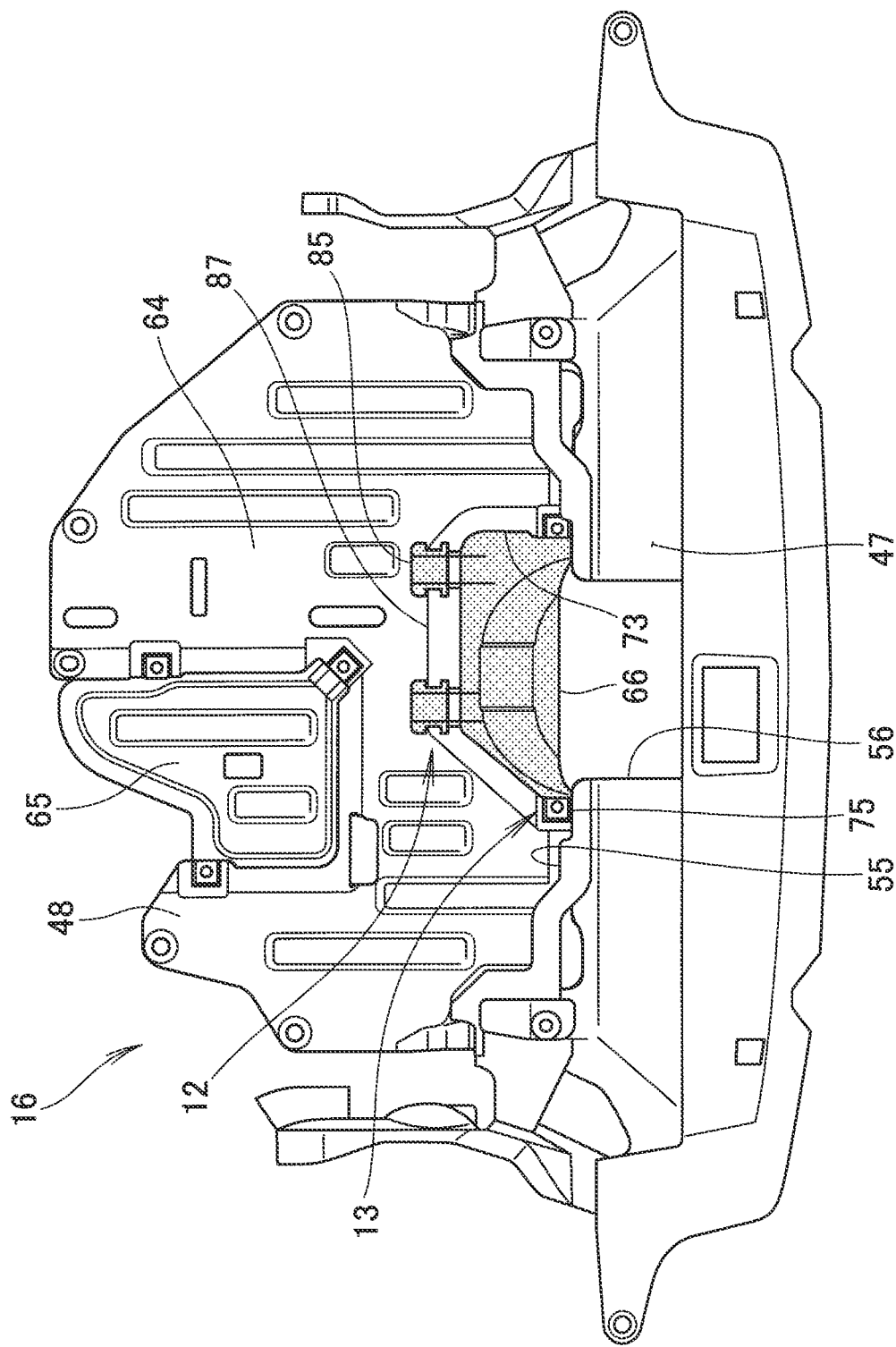
FIG. 5 is a plan view of the undercover.

As shown in FIG. 4, the front undercover 47 has a rear edge 55 cut out to form a relief opening 56. The relief opening 56 is provided to open beneath a jack-retainer section 57 provided at the middle of the front crossbeam 33 of the front sub-frame 25.

Figure 7:
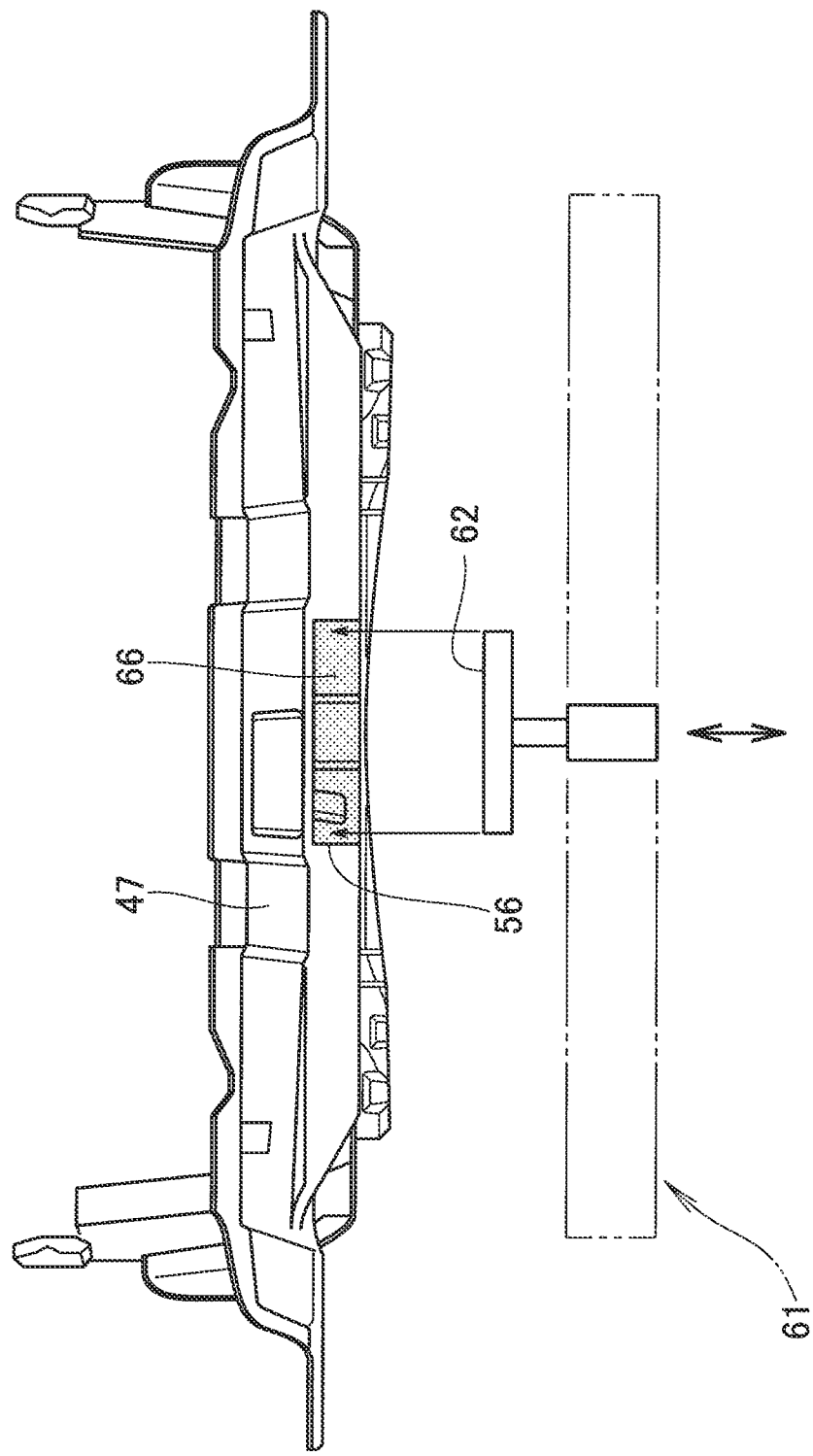
FIG. 7 is a front view of the undercover.

The front sub-frame 25 can be jacked up and down while the front sub-frame 25 including the jack-retainer section 57 is supported on a lift device 61 (FIG. 7). In this instance, the relief opening 56 prevents a front jack bearing surface 62 (FIG. 7) of the lift device 61 from interfering with the front undercover 47.

The rear undercover 48 covers the engine body 26 and the transmission from below, as shown in FIG. 6. The rear undercover 48 is composed of a rear undercover body 64 formed from synthetic resin or plastic, an exhaust heat cover 65 formed of a steel plate, and a plastic lid 66 formed from synthetic resin or plastic (as indicated by a dotted pattern). As shown in FIG. 4, the rear undercover 48 had an edge attached by clips 71 (also see FIG. 14) to a bottom 68 of the front sub-frame 25.

The rear undercover 48 has an adjustment opening 73 formed in the vicinity of the engine front mount 31. The adjustment opening 73 forms a part of the lid structure 12.

Figure 12:
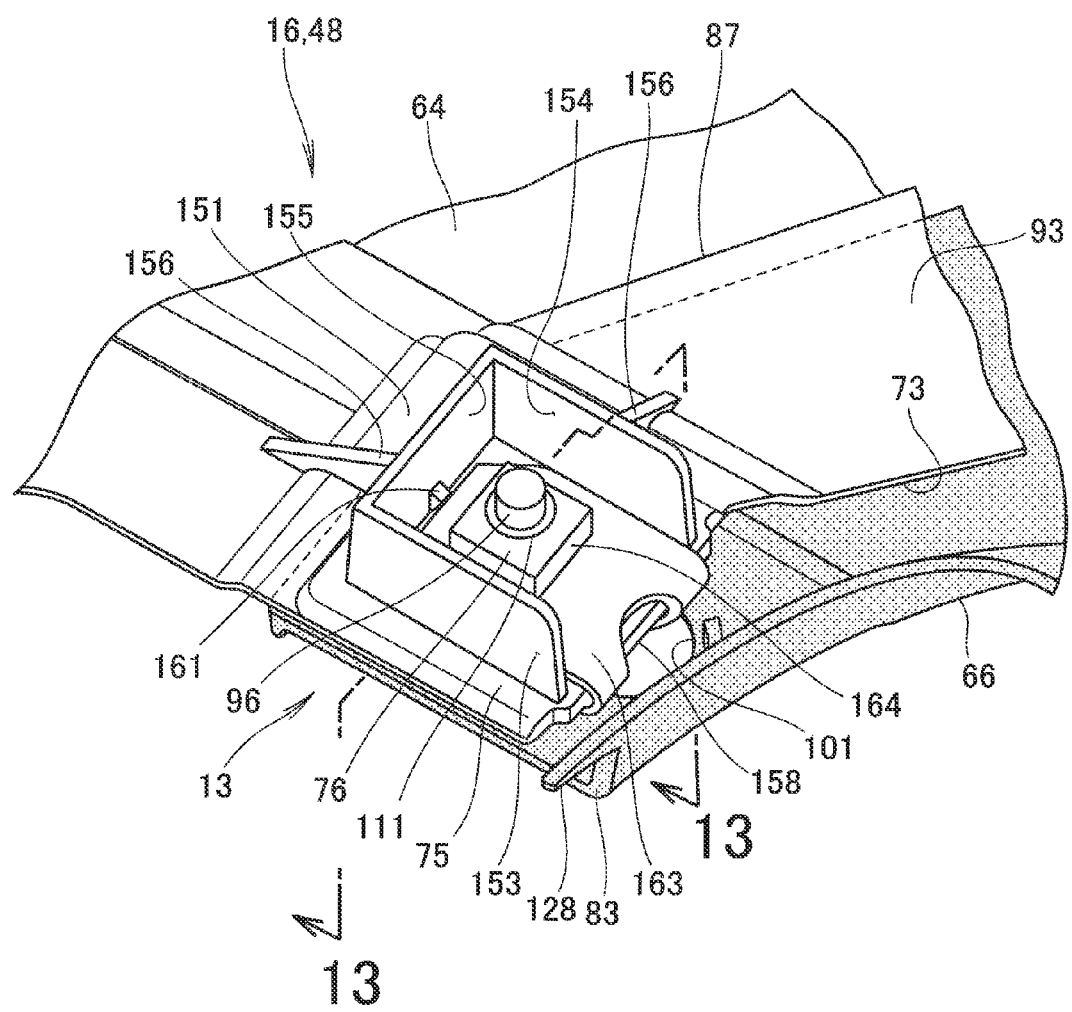
FIG. 12 is an enlarged view of an area 12 shown in FIG. 8.

In the lid structure 12, the lid 66 is attached to the adjustment opening 73 by a fastening device 13. As shown in FIG. 12, the fastening device 13 includes an undercover fastening section 75 provided on the rear undercover 48, and an internal thread member 76 provided on the undercover fastening section 75.

Referring now to FIGS. 1-11, 14 and 17-19, the lid structure 12 is configured such that one end portion 83 (FIG. 11) of the lid 66 is releasably connected to the under cover 16 that covers the vehicle body 17 of the vehicle 17 or an engine room 81 of the vehicle body from below, and an opposite end portion 84 of the lid 66 is hooked or caught onto the undercover 16 or another undercover (not shown).

Figure 11:
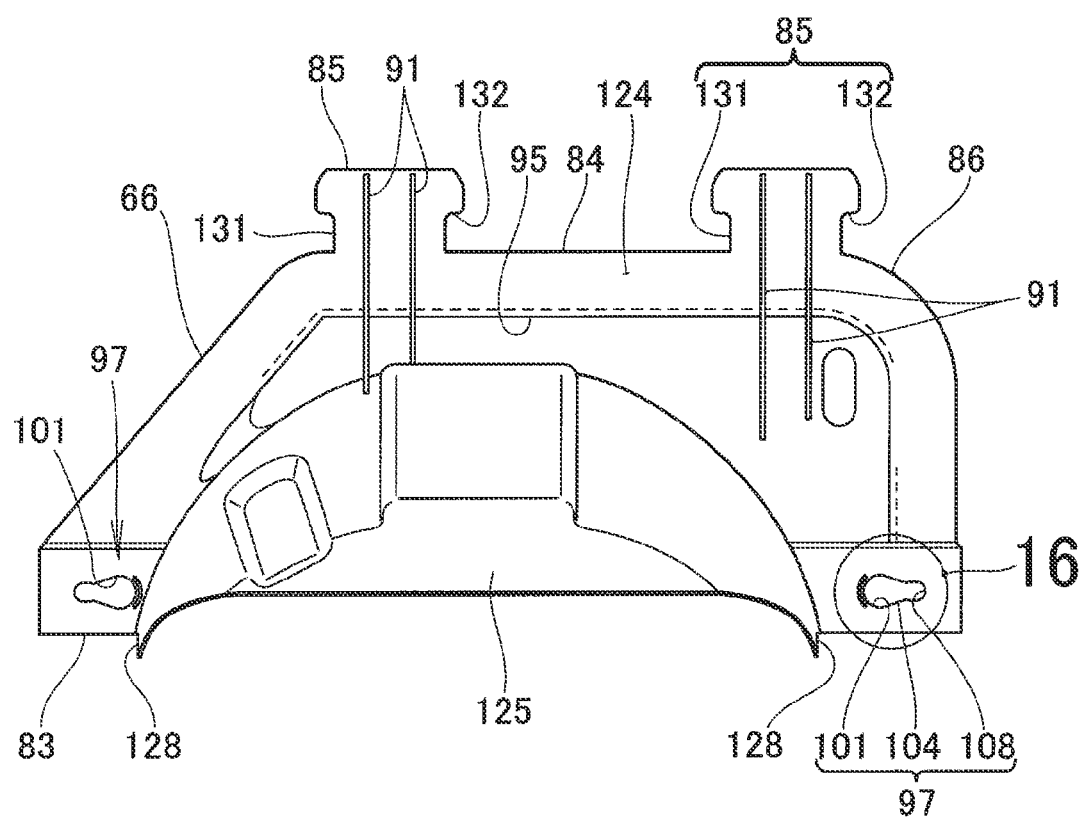
FIG. 11 is a plan view of a lid.
Figure 17:
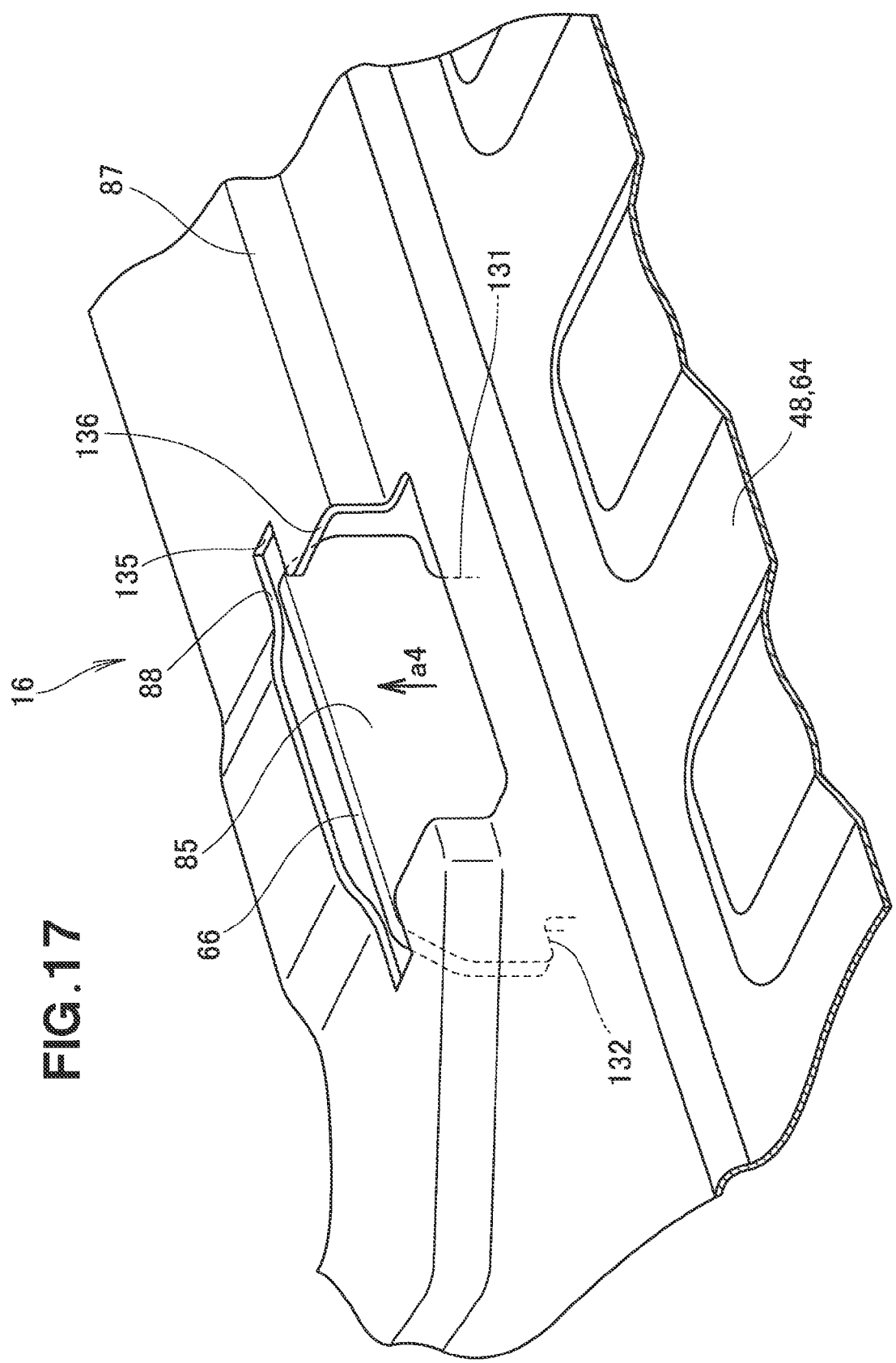
FIG. 17 is a view illustrative of the manner in which the lid is assembled with the undercover.

As shown in FIGS. 11 and 17, the lid structure 12 include T-shaped engagement hooks 85, a stepped section 87 formed on the undercover 16 and configured to extend along an edge 86 of the lid 66 so as to engage and hold the engagement hooks 85, and an assembly hole 88 formed in the stepped section 87 and configured to allow the passage of the engagement hooks 85.

Figure 10:
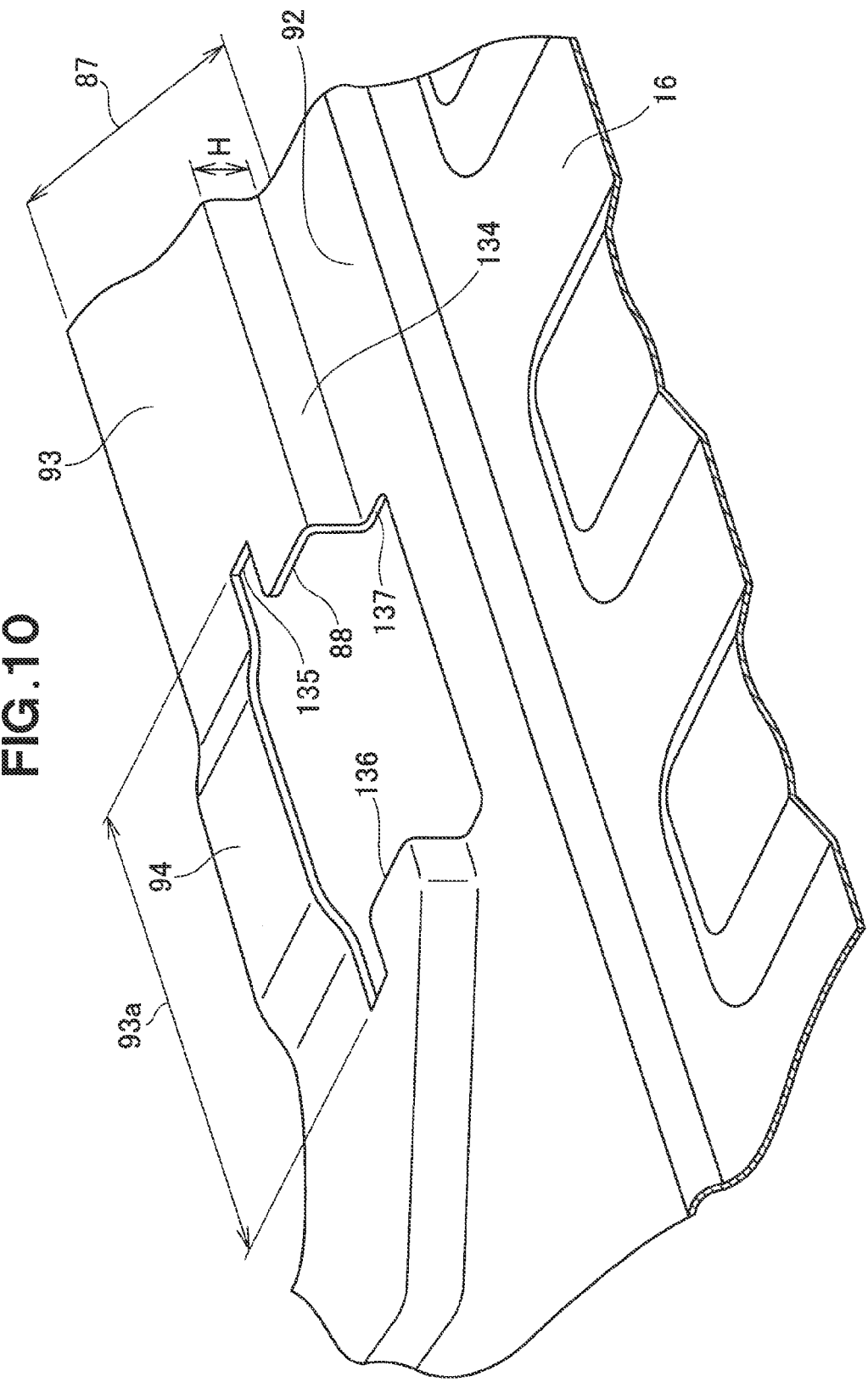
FIG. 10 is a perspective view of a stepped portion and the assembly hole of the undercover.

The lid structure 12 has ribs 91 (FIGS. 11, 14 and 19) extending from each engagement hook 85 toward the one end portion 83 of the lid 66. As shown in FIGS. 10 and 11, the stepped section 87 includes a step 93 higher than an inner surface 92 of the undercover 16 by a height H, and a bulged portion 94 provided on the step 93 and extending along the inner surface 92 of the undercover 16 so as to avoid interference with the lid 66 when the lid 66 is closed.

The lid structure 12 also includes a stepped rib 95 (also see FIG. 19) formed on the lid 66 and extending across the ribs 91. The one end portion 83 of the lid 66 is secured to the undercover 16 by means of bolts 96 (FIG. 12) rotatably held on the lid 66.

Figure 8:
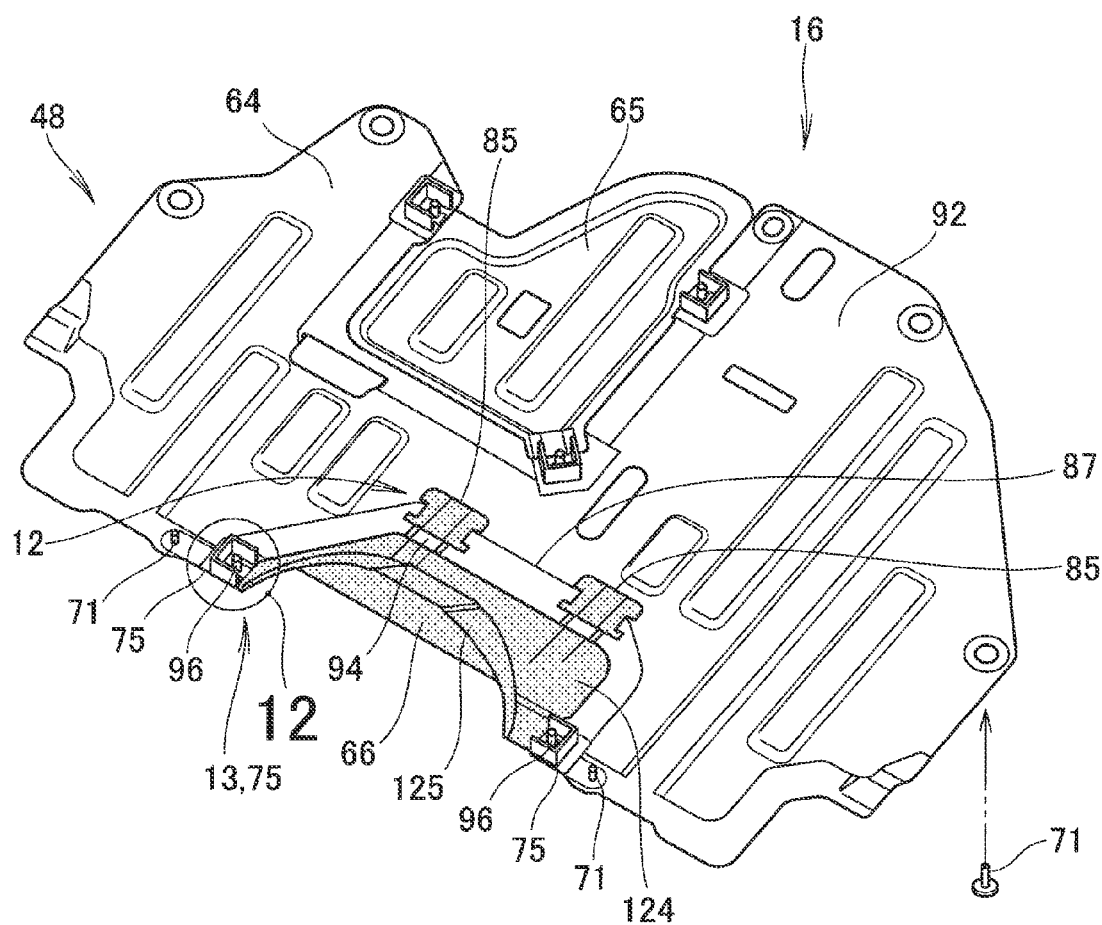
FIG. 8 is a perspective view illustrative of the manner in which a lid-fastening structure is mounted.
Figure 9:
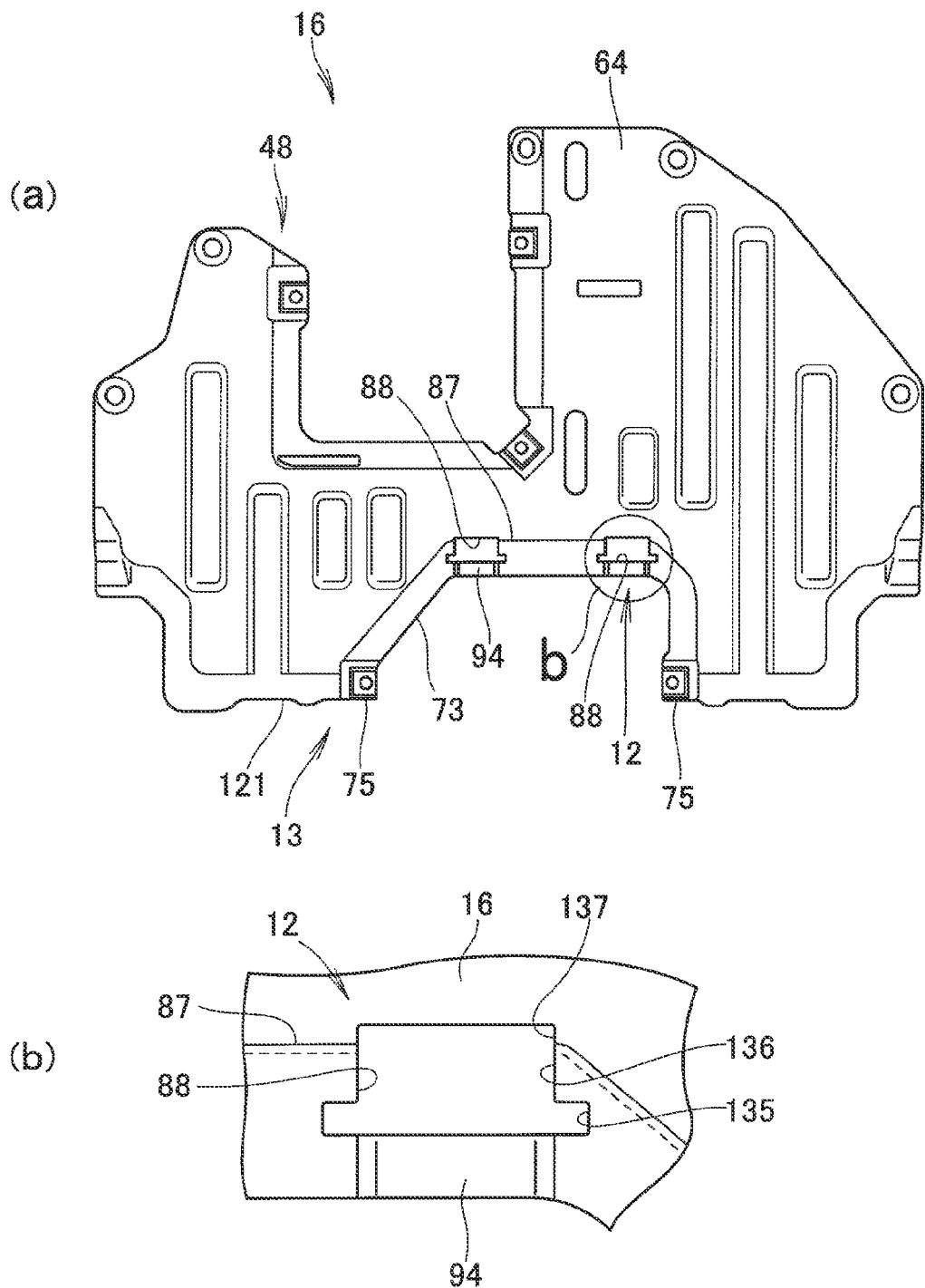
FIG. 9 is a plan view showing an assembly hole of the undercover, wherein (a) of FIG. 9 is a diagrammatical view, and (b) of FIG. 9 is a detailed view of a portion b of FIG. 9(a)

As shown in FIGS. 8, 9 and 12, the lid-fastening structure 13 includes the bolts 96 rotatably held on the lid 66 that closes the opening (adjustment opening) 73. Reference numeral 97 denotes a fastening opening (see FIG. 16) through which each bolt 96 passes.

Figure 16:
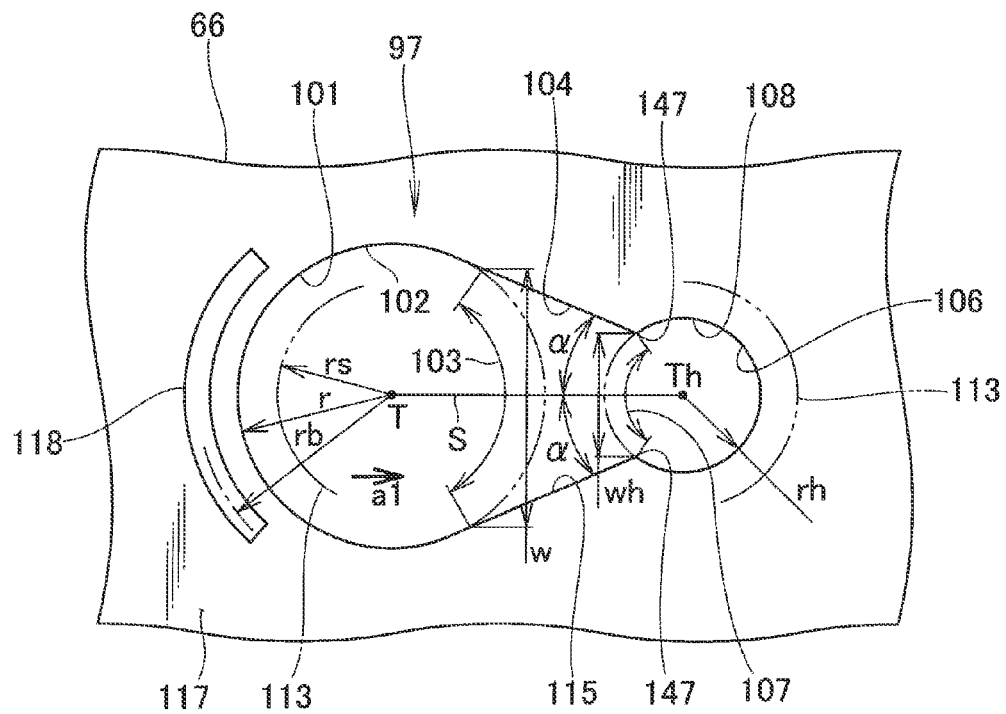
FIG. 16 is an enlarged view of an area 16 shown in FIG. 11.

As shown in FIG. 16, the lid 66 has an insertion hole 101 formed to allow insertion of the bolt 96 (FIG. 13), and a backslide-limiting opening 104 formed by cutting out a portion 103 of a circumferential edge 102 of the insertion hole 101 in such a way as to allow the bolt 96 to slide (in the direction of arrow a1), the backslide-limiting opening 104 being continuous with the circumferential edge 102 and configured as to limit returning of the bolt 96 to the insertion hole 101.

Furthermore, the lid 66 also has a supporting/fastening hole 108 formed contiguous with the backslide-limiting opening 104 into a radius rh smaller than a radius r of the insertion hole 101. A portion 107 of a circumferential edge 106 of the supporting/fastening hole 108 is cut out to allow the bolt 96 to enter the supporting/fastening hole 108 (in the direction of arrow a1).

Figure 13:
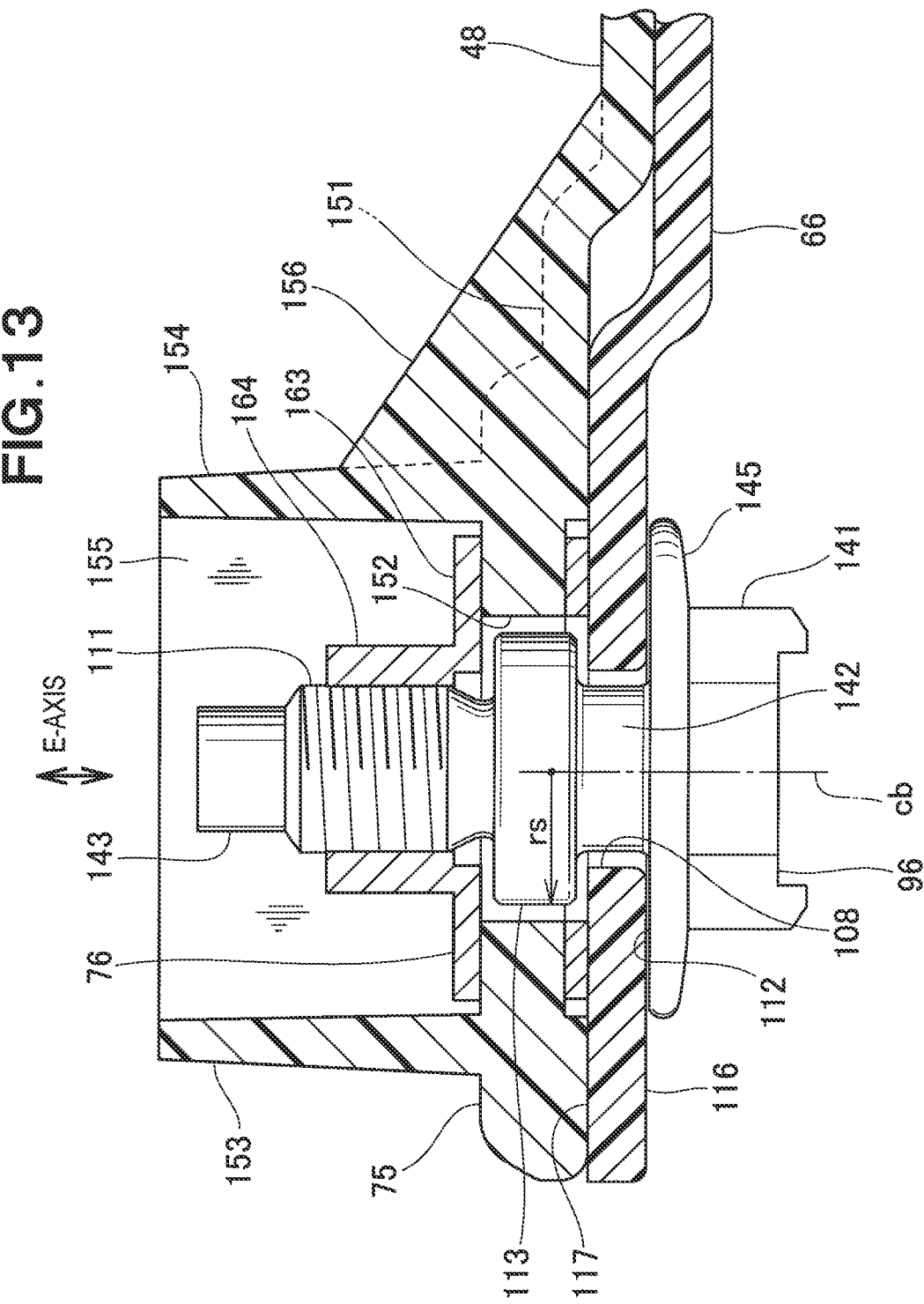
FIG. 13 is a cross-sectional view taken along line 13-13 of FIG. 12.

As shown in FIG. 13, the bolt 96 has an external thread 111, a bearing surface 112, and a retainer part 113 provided between the external thread 111 and the bearing surface 112 for preventing removal of the bolt 96 from the supporting/fastening hole 108. The retaining part 113 prevents the bolt 96 from moving in the direction of an axis cb of the bolt 96 (i.e., the E-axis direction) and eventually dropping off from the supporting/fastening hole 108.

A portion including the backslide-limiting opening 104 of the lid 66 is formed by a material such as plastic which is elastically deformable when the bolt 96 is forced to slide (in the direction of arrow a1). The backslide opening 104 has a tapered guide portion 115 having a width reducing gradually in a direction away from the insertion hole 101 (i.e., the direction of arrow a1) from a maximum width W to a minimum width Wh.

The retainer part 113 is in the form of a disk having a radius rs which is smaller than the radius r of the insertion hole 101 and larger than the radius rh of the supporting/fastening hole 108.

The lid 66 has a front side 116 (FIGS. 13, 14, 15 and 22) adapted to be pressed by the bearing surface 112 of the bolt 96, and a back side 117 on which is formed a protrusion 118 of an arcuate shape (having a radius rb) for abutting engagement with the bearing surface 112 of the bolt 96 when the bolt 96 is inserted into the insertion hole 101 from the back side 117 (in the direction of arrow a2).

The fastening device 13 includes the bolts 96 provided on the lid 66, and the fastening openings 97 (each including the insertion hole 101, the supporting/fastening hole 108, and the backslide-limiting opening 104) formed in the lid 66. The fastening device 13 also includes the undercover fastening sections 75 and the internal thread members 76 that are provided on the rear undercover 48.

As shown in FIG. 13, each bolt 96 has a head 141, a support shank 142, the retainer part 113, the external thread 111, and a positioning part 143. The head 141 has the bearing surface 112 and a flange 145.

The support shank 142 has an outside diameter substantially equal to an outside diameter of the external thread 111, and a length in a direction of the axis cb of the bolt 96 (i.e., the E-axis direction) which is slightly larger than a thickness of the lid 66 of the undercover 16 (by 2 mm, for example).

Figure 15:
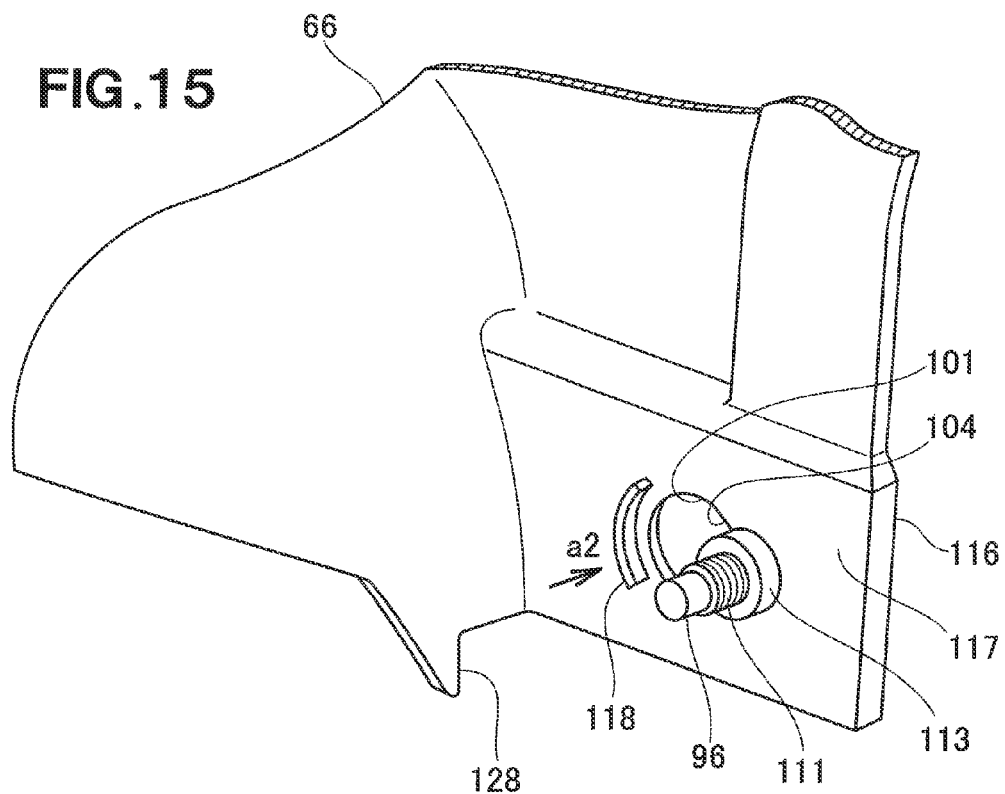
FIG. 15 is an enlarged view of an area 15 shown in FIG. 14.

The retainer part 113 is in the form of a disk and has the radius rs substantially equal to a radius of the head 141 so that the retainer part 113 can pass through the insertion hole 101 formed in the lid 66 as shown in FIGS. 15 and 16. The radius r of the insertion hole 111 is larger than that of the retainer part 113. The insertion hole 101 has a mouth (cutout portion 103) formed in the circumferential edge thereof near the supporting/fastening hole 108.

The radius rh (FIG. 16) of the supporting/fastening hole 108 is slightly larger than the radius of the support shank 142 of the bolt 96. The supporting/fastening hole 108 has a mouth (cutout portion 107) formed in the circumferential edge thereof near the insertion hole 101 (as indicated by a phantom line) so that the supporting/fastening hole 108 is continuous with the backslide-limiting opening 104.

As shown in FIG. 16, the backslide-limiting opening 104 has a guide portion 115 formed at a desired angle α relative to a line S passing through the center T of the insertion hole 101 and the center Th of the supporting/fastening hole 108.

Stopper parts 147, 147 are formed at junctions between the guide portion 115 and the circumferential edge of the supporting/fastening hole 108 (located adjacent to the cutout portion 107). The lid 66 is fastened to the undercover fastening section 75 by means of the bolt 96 while the bolt 96 is held in position against displacement by the stopper parts 147, 147.

As shown in FIGS. 10, 12, 13 and 20, the undercover fastening section 75 includes a raised fastening part 151 raised from the step 93 of the stepped section 87 at a front part of the step 93. The raised fastening part 151 has a hole 152 for the passage therethrough of the retainer part 113 of the bolt 96.

With the hole 152 being at the center, a first positioning rib 153 and a second positioning rib 154 are formed in opposed relation, and a third positioning rib 155 is formed continuously with, the first and second positioning ribs 153, 154. Reinforcing ribs 156 are disposed outside the second and third positioning ribs 154, 155 and formed integrally with the second and third positioning ribs 154, 155, respectively.

The first positioning rib 153 faces forwardly of the vehicle 11 and is disposed upright along a front edge of the raised fastening part 151 directed forwardly of the vehicle 11. The raised fastening part 151 has an inner edge 158 (FIG. 12) facing the lid 66, and the internal thread member 76 is assembled with the inner edge 158 so as to grip the raised fastening part 151.

The third positioning rib 155 has an internal thread positioning stopper 161 formed at an inner side thereof for determining a position (in the vehicle width direction) of the internal thread member 76.

By thus providing the first, second and third ribs 153, 154, 155, it is possible to increase the strength of the raised fastening part 151. Furthermore, by virtue of the first and second ribs 153, 154 and the internal thread positioning stopper 161, it is possible to restrict movement of the internal thread member 76 in both a longitudinal (or front-rear) direction of the vehicle 11 and a width direction of the vehicle 11.

As shown in FIGS. 12 and 13, the internal thread member 76 is assembled from the inner edge 158 of the raised fastening part 151 so that a clip portion 163 grips the raised fastening part 151. The internal thread member 163 is composed of the clip portion 163 and an internal thread portion 164 formed integrally with the clip portion 163. The internal thread member 76 is slightly movable in both the vehicle width direction and the longitudinal direction of the vehicle so that it can move to accommodate dimensional variation of various parts when the bolt 96 is threaded into the internal thread member 76.

Referring next to FIGS. 17 to 20, lid assembly operation will be described. As shown in FIG. 17, each engagement hook 85 of the lid 66 is inserted through an insertion hole 135 of a corresponding one of the assembly holes 88 of the rear undercover 48, as indicated by the arrow a4.

Figure 18:
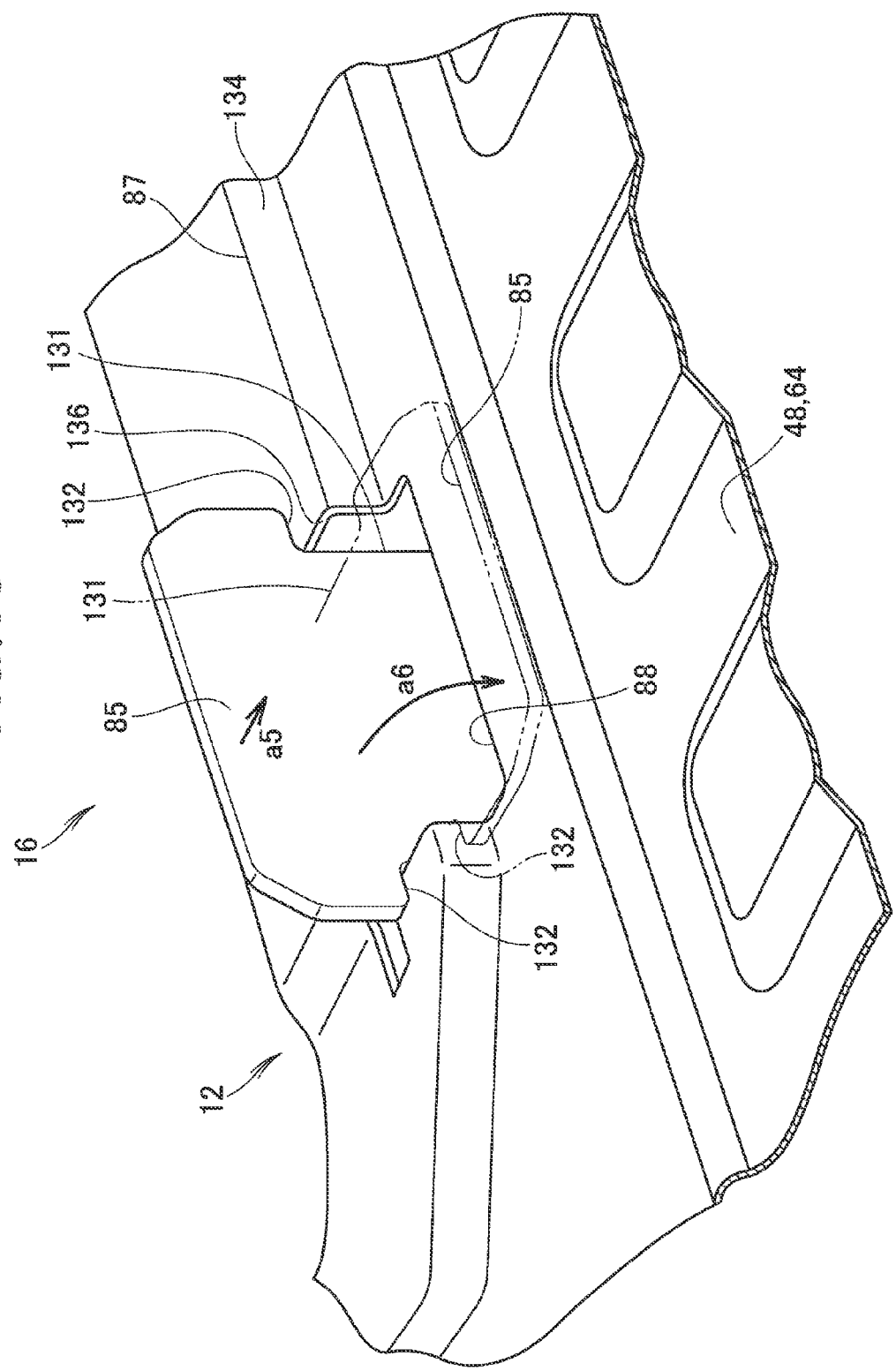
FIG. 18 is a view illustrative of the manner in which a hook of the lid inserted through the assembly hole of the undercover.

Then, as shown in FIG. 18, lateral projections 132, 132 and a suspending support part 131 of the engagement hook 85 pass in succession through the insertion hole 135. With the suspending support part 131 being inserted through a slide hole 136 of the assembly hole 88, the lid 66 is turned in the direction of the arrow a6 while the suspending support part 131 is allowed to slide along the slide hole 136 (also see FIG. 19) in the direction of the arrow a5.

Figure 19:
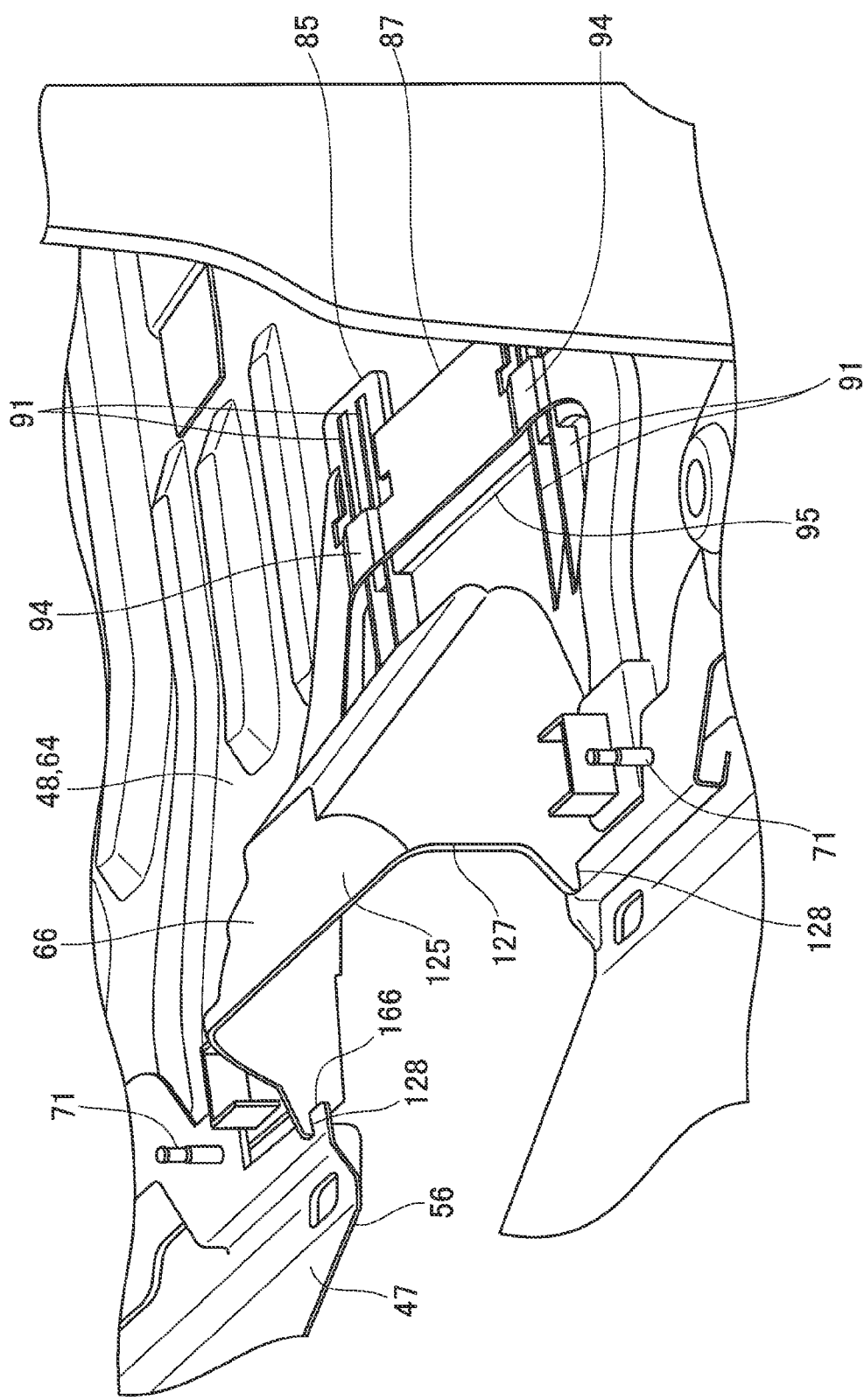
FIG. 19 is a perspective view of the lid as it has laid down from the position of FIG. 18.
Figure 20:
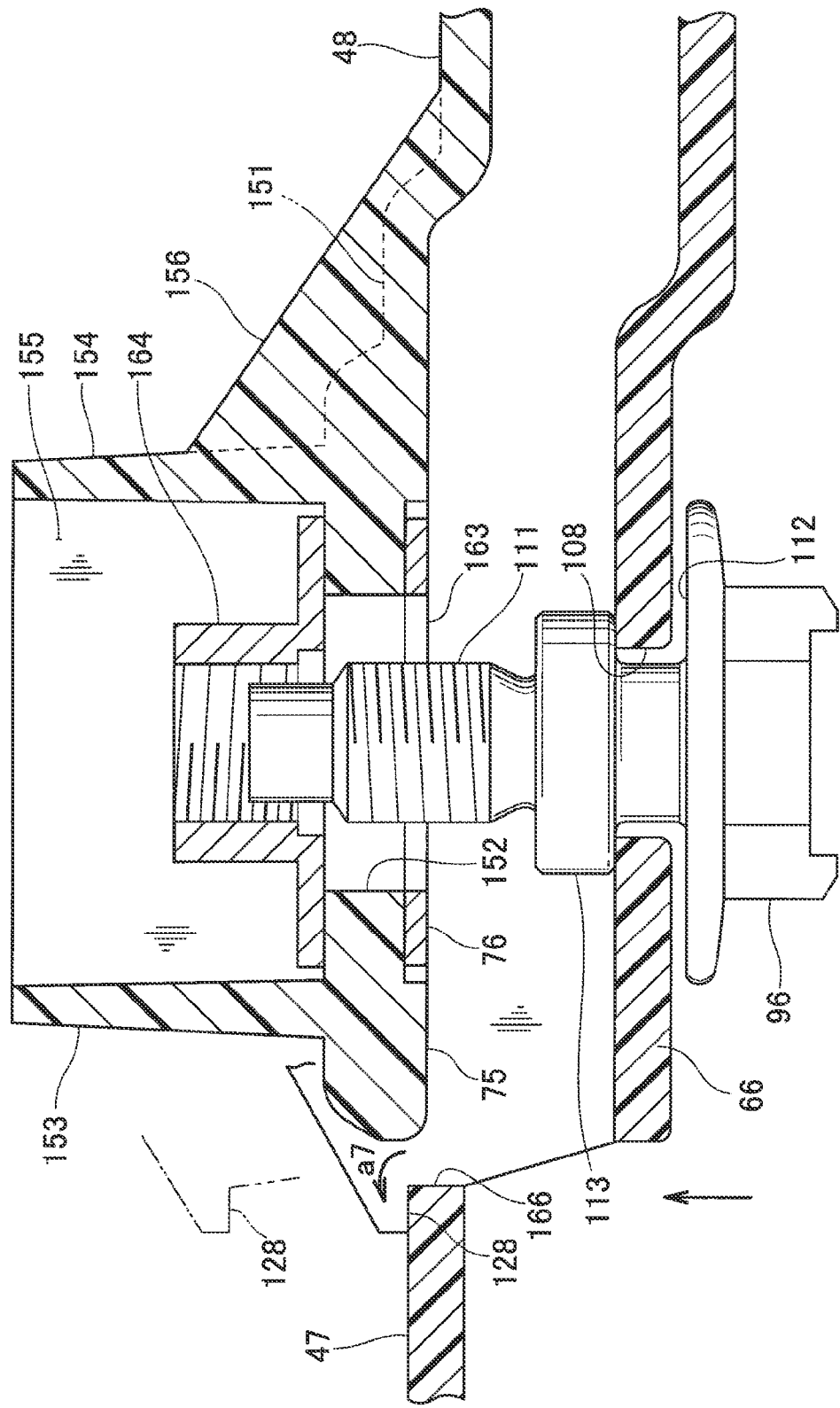
FIG. 20 is a cross-sectional view illustrative of the manner in which the lid is attached to the undercover by a bolt.

Subsequently, as shown in FIGS. 18, 19 and 20, temporary stopper prongs 128 of the lid 66 are engaged with a rear edge 166 of the front undercover 47 located adjacent to the relief opening 56, as indicated by the arrow a7. In this instance, the lateral projections 132 of each engagement hook 85 of the lid 66 are disposed near a wall 134 of the stepped section 87 but they are not in contact with the wall 134 of the stepped section 87.

Finally, the bolts 96 held in advance on the lid 66 are threaded into internal thread portions 164 of the internal thread members 76 provided on the undercover fastening section 75 of the rear undercover 48 until the bolts 96 assume the position shown in FIG. 13. Assembly of the lid 66 is thus completed.

Operation of the lid-fastening structure 13 will next be described. The lid-fastening structure 13 can retain the bolts 96 while keeping a condition in which the 96 are fitted in the supporting/fastening holes 108 (FIG. 16) of the lid 66. With this arrangement, there is no need locate bolts when the lid 66 is to be reattached after removal. The lid-fastening operation using the bolts 96 can thus be achieved in a rapid manner.

Figure 21:
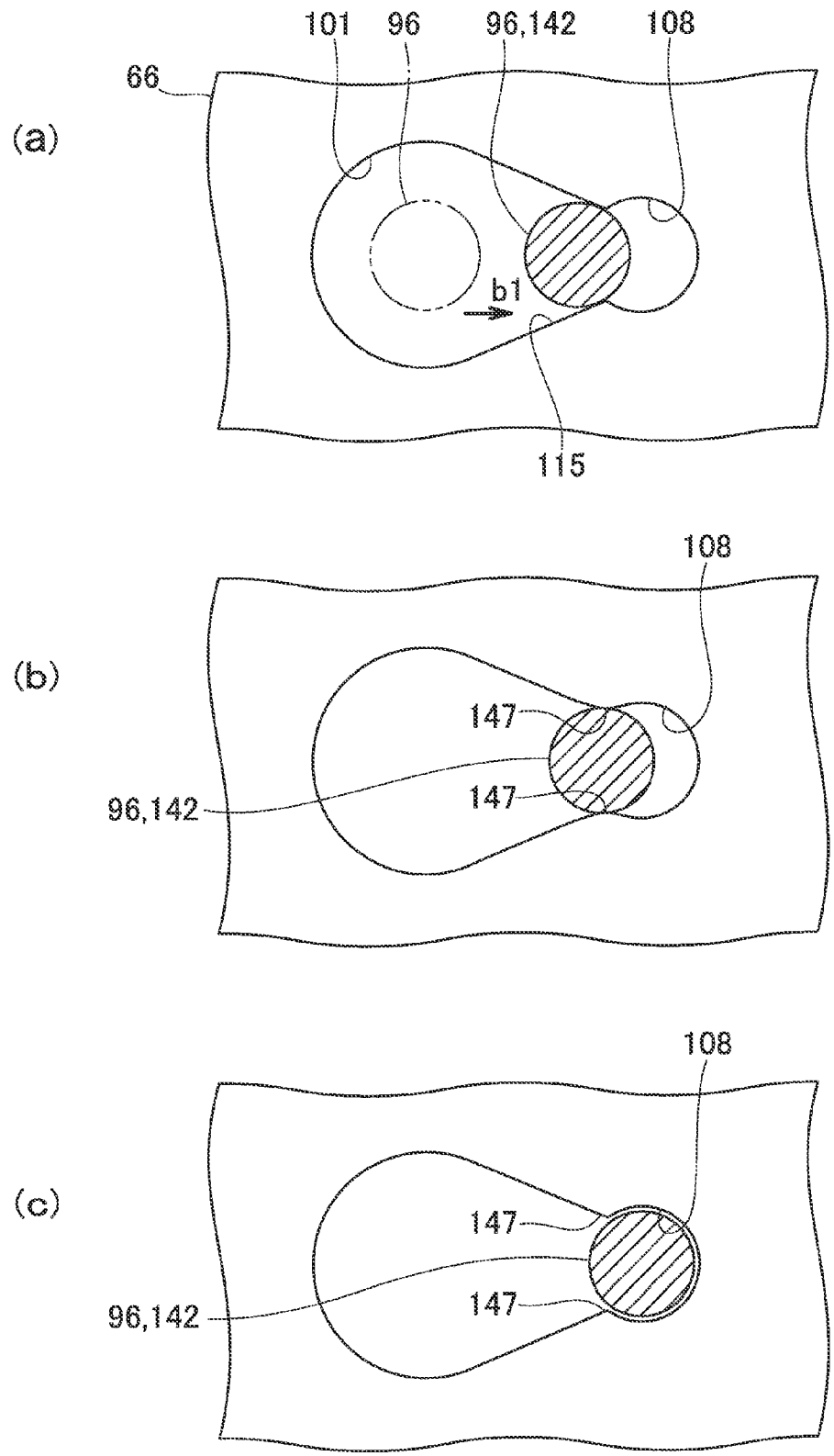
FIG. 21 is a view showing a bolt backslide preventing mechanism for preventing backslide of the bolt, wherein (a) of FIG. 21 is a view illustrative of the manner in which the bolt is inserted, (b) of FIG. 21 is a view showing the bolt as it is sliding, and (c) of FIG. 21 is a view showing the bolt as it is in an assembled state.

Referring next to FIGS. 21 and 22, description will be made of the manner in which the bolts 96 are assembled and also of an operation to limit returning of the bolts 96.

At first, each bolt 96 is held with its distal end directed toward the front side 116 of the lid 66, as indicated by phantom lines shown in FIG. 22, and the bolt 96 is inserted through the insertion hole 101 of the lid 66, as indicated by phantom lines shown in FIG. 21(a) until the bearing surface 112 of the head 141 of the bolt 96 comes in contact with the rear undercover 48, or alternatively, the support shank 142 of the bolt 96 is disposed in confrontation with an inner circumference of the insertion hole 101.

Then the bolt 96 is moved to slide in the direction of the arrow b1. In this instance, the support portion 115 guides sliding movement of the support shank 142 of the bolt 96. Subsequently, the support shank 142 comes in contact with the stopper parts 147 and then forces the stopper parts 147 to undergo elastic deformation, as shown in FIG. 21(b).

Finally, the support shank 142 passes through the stopper parts 147 and enters the supporting/fastening hole 108, whereupon the stopper parts 147 recover their original shape and, hence, the mouth (cutout portion 107) becomes narrower than the diameter of the support shank 142. Now, the bolt 96 is hardly possible to move out from the supporting/fastening hole 108. Assembly of the bolts 96 is thus completed.

Figure 14:
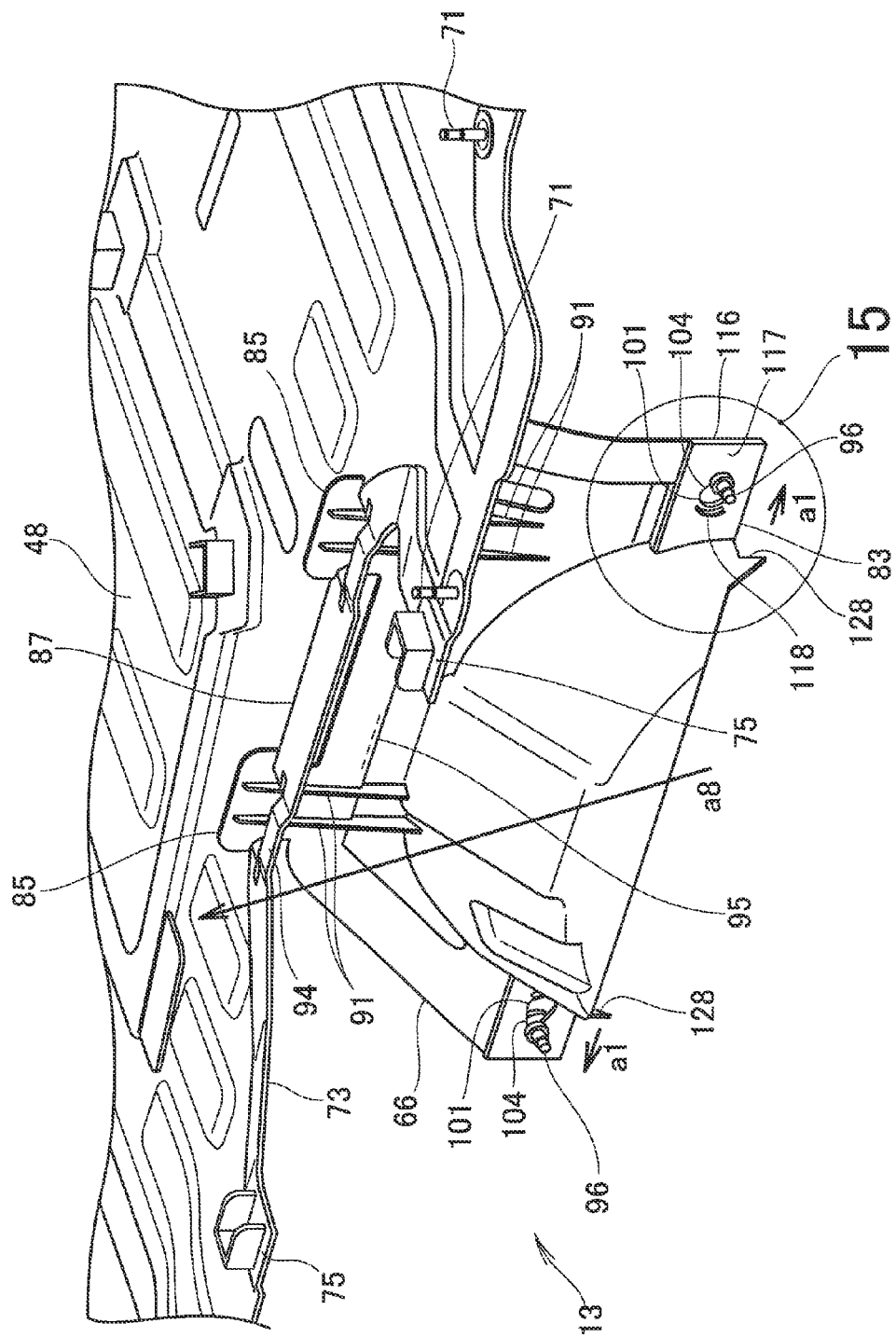
FIG. 14 is a perspective view showing the lid as it is in an open position.

In the lid-fastening structure 13, because the bolts 96 are retained in a condition in which the bolts 96 are fitted in the supporting/fastening holes 108 of the lid 66, there is no need to locate bolts when the lid 66 is reattached after removal (see FIGS. 1 and 14). The bolt fastening operation can thus be achieved speedily.

Referring next to FIG. 22, a function to prevent wrong assembly of the bolt 96 will be described. If the bolt 96 is inserted into the insertion hole 101 from the back side 117 of the lid 66 as indicated by the arrow b2, the bolt 96 will tilt to one side due to interference with the bearing surface 112 of the bolt 96 and the protrusion 118 before the support shank 142 is fully received in the insertion hole 101.

With the bolt 96 thus tilting, the bearing surface 112 and the retainer part 113 of the bolt 96 are non-parallel with a surrounding surface of the insertion hole 101 (on the back side 117) and may interfere with the lid. The bolt 96 is no longer possible to move in a direction toward the supporting/fastening hole 108. Wrong insertion of the bolt 96 from the opposite side (back side 117) can thus be prevented.

Referring back to FIGS. 9 to 11, the lid structure 12 will be described in detail. The lid structure 12 includes the aforesaid adjustment opening 73, the lid 66, the engagement hooks 85, the stepped section 87, the assembly hole 88, the ribs 91, the bulged portion 94, and the stepped rib 95.

As shown in FIG. 9, the adjustment opening 73 is an opening formed by cutting out a part of a front edge 121 of the rear undercover 48 so as to face in a forward direction of the vehicle 11. The adjustment opening 73 includes the stepped section 87 formed such that when the lid 66 is in the closed position, the lid 66 is received in the stepped section 87 and located at substantially the same height as a ground height of the undercover 16.

The lid 66 has a body 124 formed into a generally rectangular plate-like configuration, as shown in FIGS. 8, 11 and 19. The lid body 124 has an inverted U-shaped bulged body portion 125 provided at a front end thereof so as to avoid interference with the jack bearing surface 62 of the lift device 61 (FIG. 7).

As shown in FIG. 19, the bulged body portion 125 has an edge 127 rising to face forwardly of the vehicle 11, and the temporary stopper prongs 128 project from the edge 127 in a forward direction of the vehicle 11. The stepped rib 95 (FIG. 11) is formed between the engagement hooks 85 and the bulged body portion 125 of the lid body 124 and extends along the edge 86 (FIG. 11) of the lid 66.

As shown in FIG. 11, each of the engagement hooks 86 is formed by the suspending support part 131 formed to project from the lid 61, and the pair of lateral projections 132 formed to project from a distal end of the suspending support part 131 in opposite lateral directions perpendicular to the suspending support part 131. When the lid 66 is opened (FIG. 14), the lateral projections 132 are hooked on the stepped section 87.

As shown in FIG. 10, the stepped section 87 includes the wall 134 formed at a front portion of the undercover 16 and extending vertically upward from the inner surface 92 of the undercover 16, and the step 93 formed continuously with the wall 134 and extending parallel to the undercover 16. The bulged portion 93 provided on the step 93 has a length corresponding to a distance between two adjacent ones of the ribs 91.

The assembly hole 88 formed in the undercover 16 has a T-shaped configuration, as shown in FIGS. 9 and 10. The assembly hole 88 includes the insertion hole 135 located on a forward side of the wall 134 and extending in the vehicle width direction, and a slide hole 136 continuous with the insertion hole 135 and extending perpendicular to the insertion hole 135. The slide hole 136 has a width smaller than a width of the insertion hole 135. The assembly hole 88 further includes a suspension hole 137 continuous with the slide hole 136.

As shown in FIGS. 11, 14 and 19, two adjacent ribs 91 are formed to have a distance therebetween, which divides the width of each engagement hook 85 into three substantially equal parts. These ribs 91 have upper edges extending straightway to the center of the lid 66 and also have a height varying to accommodate the difference in level formed by the stepped rib 95. While the lid 66 is in a closed state, the ribs 91 are positioned below the bulged portion 94.

The bulged portion 94 is formed in a region to cover the distance between the two adjacent ribs 91 and is able to reinforce that part 93a (FIG. 10) of the step 93 in which the assembly hole 88 is formed.

Referring next to FIGS. 17 to 20, description will be made of the manner in which the lid 66 is assembled. Firstly, as shown in FIG. 17, each of the engagement hooks 85 of the lid 66 is inserted in the insertion hole 135 of the assembly hole 88 of the rear undercover 48 as indicated by the arrow a4.

Then, as shown in FIG. 18, the lateral projections 132 and the suspending support part 131 of the engagement hook 85 are caused to pass in succession through the insertion hole 135. The suspending support part 131 is placed in a condition in which it is inserted through the slide hole 136 of the assembly hole 88, and the lid 66 is then turned in the direction of the arrow a6 while the suspending support part 131 is allowed to slide along the slide hole 136 as indicated by the arrow a5 (also see FIG. 19).

Subsequently, as shown in FIGS. 19 and 20, the temporary stopper prongs 128 of the lid 66 are engaged with and held on the rear edge 166 of the front undercover 47 located adjacent to the relief opening 56, as indicated by the arrow a7. In this instance, the lateral projections 132 of each engagement hook 85 of the lid 66 are disposed near the wall 134 (FIG. 18) of the stepped section 87 but they are not in contact with the wall 134.

Finally, the bolts 96 held in advance on the lid 66 are threaded into the internal thread portions 164 of the internal thread members 76 provided on the undercover fastening section 75 of the rear undercover 48 until the bolts 96 assume the position shown in FIG. 13. Assembly of the lid 66 is thus completed.

Description will next be made of operation of the lid structure 12. In the lid structure 12, because the lid 66 is assembled in the manner as described above, the lid assembling operation is made easier and the assembly time can be reduced.

When the lid 66 is opened as shown in FIGS. 1 and 14, for the purpose of assembly or maintenance, for example, the engagement hooks 85 are engaged with and held on the stepped section 87 of the rear undercover 48 so that the lid 66 hangs down from the rear undercover 48 without detachment. This eliminates the need to manually remove the lid 66 from the rear undercover 48 and place the lid 66 near the human operator. Thus, the maintenance time can be reduced.

During the assembly process, the bolt 43 and the nut 44 of the engine front mount 31 are tightened with a desired toque.

Prior to the assembly process, the engine 15 is mounted on the front sub-frame 25, and the bolt 43 and the nut 44 are tightened with a torque which is about half of the desired torque. Subsequently, the undercover 16 is attached to the front sub-frame 25.

Thereafter, the front sub-frame 25 is lifted upward, and the engine 15 is fastened to the left and right front side frame 23.

Finally, during the assembly process, the lid 66 is opened and allowed to hand down, as shown in FIGS. 1 and 14. Then, the lid 66 is turned in the direction of the arrow a8 shown in FIG. 14 and, thereafter, the bolt 43 and the nut 44 of the engine front mount 31 are tightened until a desired axial force is obtained.

INDUSTRIAL APPLICABILITY

With the arrangements so far described, the present invention can be used advantageously as a lid-fastening structure for an automobile.

REFERENCE SIGNS LIST

11: vehicle
12: lid structure
13: lid-fastening structure
16: undercover
17: vehicle body
66: lid
73: opening (adjustment opening)
81: engine room
83: one end portion of lid
84: opposite end portion of lid
85: engagement hook
86: edge of lid
87: stepped section
88: assembly hole
91: rib
92: inner surface of undercover
93: step
94: bulged portion
95: stepped rib
96: bolt
101: insertion hole
102: circumferential edge of insertion hole
103: portion of circumferential edge of insertion hole
104: backslide-limiting opening
106: circumferential edge of supporting/fastening hole
107: portion of circumferential edge of supporting/fastening hole
108: supporting/fastening hole
111: external thread of bolt
112: bearing surface of bolt
113: retainer part of bolt
115: guide portion
116: front side of lid
117: back side of lid
118: protrusion
r: radius of insertion hole
rh: radius of supporting/fastening hole
rs: radius of retainer part

The invention claimed is:

1. A lid-fastening structure comprising:
an undercover having an adjustment opening;
a lid for closing the adjustment opening of the undercover; and
a bolt rotatably held in the lid,
wherein the lid includes:
an insertion hole formed to allow insertion of the bolt;
a backslide-limiting opening formed by cutting out a portion of a circumferential edge of the insertion hole in such a way as to allow the bolt to slide, the backslide-limiting opening being continuous with the circumferential edge of the insertion hole and configured to limit returning of the bolt to the insertion hole;
a supporting/fastening hole formed continuous with the backslide-limiting opening to a radius smaller than a radius of the insertion hole, the supporting/fastening hole having a circumferential edge partially cut out to allow the bolt to enter the supporting/fastening hole; and
a retainer part formed between an external thread and a bearing surface of the bolt for preventing the bolt from dropping off,
wherein the lid further includes one end portion releasably connectable to the undercover and an opposite end portion including a T-shaped engagement hook engaged with and held on the undercover,
wherein the undercover has a stepped section configured to extend along an edge of the adjustment opening for engagement with the engagement hook,
wherein the stepped section has a wall formed to extend upright from an inner surface of the undercover, and a step formed continuously with an upper end of the wall and extending parallel to the inner surface of the undercover,
wherein the stepped section is receptive of a part of the lid when the lid is closed,
wherein the wall of the stepped section is configured to extend along an edge of the opposite end portion of the lid,
wherein the undercover has a T-shaped assembly hole of a T-shaped configuration formed to penetrate the stepped section and configured to allow passage of the T-shaped engagement hook of the lid, the T-shaped assembly hole including an insertion hole formed in the step and extending in a direction along the wall of the stepped section, the insertion hole being configured to allow insertion of the engagement hook from below, a slide hole extending te-perpendicularly from the insertion hole vertically across the wall and having a width smaller than a width of the insertion hole, and a suspension hole continuous with the slide hole and formed in the inner surface of the undercover, whereby the T-shaped engagement hook of the lid inserted in the insertion hole is displaceable through the slide hole to the suspension hole where the engagement hook is hooked on the wall of the stepped section, and
wherein when the lid is closed, the T-shaped engagement hook lies flat on the inner surface of the undercover, and when the lid is opened, the T-shaped engagement hook is hooked on the wall of the stepped section to thereby allow the lid to hang down from the undercover without detachment from the undercover.

2. The lid-fastening structure of claim 1, wherein a portion including the backslide-limiting opening of the lid is formed by a material that is elastically deformable when the bolt is caused to slide.

3. The lid-fastening structure of claim 1, wherein the backslide-limiting opening has a tapered guide portion having a width reducing gradually in a in a direction away from the insertion hole.

4. The lid-fastening structure of claim 1, wherein the retainer part is in the form of a disk having a radius smaller than the radius of the insertion hole and larger than the radius of the supporting/fastening hole.

5. The lid-fastening structure of claim 1, wherein the lid has a front side adapted to be pressed by the bearing surface of the bolt and includes a protrusion formed on a back side thereof, the protrusion being located at a position so as to engage the bearing surface of the bolt when the bolt is inserted in the insertion hole from the back side of the lid.

6. The lid-fastening structure of claim 1, wherein the lid has a rib extending from the engagement hook toward the one end portion of the lid.

7. The lid-fastening structure of claim 1, wherein the stepped section includes a bulged portion provided on the step so as to avoid interference with the lid when the lid is closed and lying alongside the inner surface of the undercover.

8. The lid-fastening structure of claim 6, wherein the lid includes a stepped rib extending across the rib.

9. The lid-fastening structure of claim 1, wherein the one end portion of the lid is fastened to the undercover by the bolt rotatably supported on the one end portion of the lid.

10. A lid-fastening structure comprising:
an undercover having an adjustment opening;
a lid for closing the opening of the undercover; and
a bolt rotatably held in the lid,
wherein the lid includes one end portion releasably connectable to the undercover by the bolt and an opposite end portion including a T-shaped engagement hook detachably engaged with and held on the undercover,
wherein the undercover has a stepped section configured to extend along an edge of the adjustment opening for engagement with the engagement hook,
wherein the stepped section has a wall formed to extend upright from an inner surface of the undercover, and a step formed continuously with an upper end of the wall and extending parallel to the inner surface of the undercover,
wherein the stepped section is receptive of a part of the lid when the lid is closed,
wherein the wall of the stepped section is configured to extend along an edge of the opposite end portion of the lid,
wherein the undercover has a T-shaped assembly hole of a T-shaped configuration formed to penetrate the stepped section and configured to allow passage of the T-shaped engagement hook of the lid, the T-shaped assembly hole including an insertion hole formed in the step and extending in a direction along the wall of the stepped section, the insertion hole being configured to allow insertion of the engagement hook from below, a slide hole extending perpendicularly from the insertion hole vertically across the wall and having a width smaller than a width of the insertion hole, and a suspension hole continuous with the slide hole and formed in the inner surface of the undercover, whereby the T-shaped engagement hook of the lid inserted in the insertion hole is displaceable through the slide hole to the suspension hole where the engagement hook is hooked on the wall of the stepped section, and
wherein when the lid is closed, the T-shaped engagement hook lies flat on the inner surface of the undercover, and when the lid is opened, the T-shaped engagement hook is hooked on the wall of the stepped section to thereby allow the lid to hang down from the undercover without detachment from the undercover.

11. The lid-fastening structure of claim 9, wherein the lid further includes:
   a bolt insertion hole formed to allow insertion of the bolt;
   a backslide-limiting opening formed by cutting out a portion of a circumferential edge of the bolt insertion hole in such a way as to allow the bolt to slide, the backslide-limiting opening being continuous with the circumferential edge of the bolt insertion hole and configured to limit returning of the bolt to the bolt insertion hole;
   a supporting/fastening hole formed continuous with the backslide-limiting opening to a radius smaller than a radius of the bolt insertion hole, the supporting/fastening hole having a circumferential edge partially cut out to allow the bolt to enter the supporting/fastening hole; and
   a retainer part formed between an external thread and a bearing surface of the bolt for preventing the bolt from dropping off.

12. The lid-fastening structure of claim 11, wherein a portion including the backslide-limiting opening of the lid is formed by a material that is elastically deformable when the bolt is caused to slide.

13. The lid-fastening structure of claim 11, wherein the backslide-limiting opening has a tapered guide portion having a width reducing gradually in a in a direction away from the insertion hole.

14. The lid-fastening structure of claim 11, wherein the retainer part is in the form of a disk having a radius smaller than the radius of the insertion hole and larger than the radius of the supporting/fastening hole.

15. The lid-fastening structure of claim 10, wherein the lid has a front side adapted to be pressed by the bearing surface of the bolt and includes a protrusion formed on a back side thereof, the protrusion being located at a position so as to engage the bearing surface of the bolt when the bolt is inserted in the insertion hole from the back side of the lid.

16. The lid-fastening structure of claim 10, wherein the lid has a rib extending from the engagement hook toward the one end portion of the lid.

17. The lid-fastening structure of claim 10, wherein the stepped section includes a bulged portion provided on the step so as to avoid interference with the lid when the lid is closed and lying alongside the inner surface of the undercover.

18. The lid-fastening structure of claim 16, wherein the lid includes a stepped rib extending across the rib.

* * * * *